United States Patent
Brommer

(10) Patent No.: US 11,771,095 B2
(45) Date of Patent: Oct. 3, 2023

(54) **HERBICIDAL *MENTHA* PANTSD, EXTRACT COMPOSITIONS AND METHODS OF USING SAME000000000000000,001**

(71) Applicant: Harpe Bioherbicide Solutions Inc., Raleigh, NC (US)

(72) Inventor: Chad L. Brommer, Raleigh, NC (US)

(73) Assignee: Harpe Bioherbicide Solutions Inc., Raleigh, NC (US)

( * ) Notice: Subject to any disclaimer, the term of this patent is extended or adjusted under 35 U.S.C. 154(b) by 26 days.

(21) Appl. No.: 17/249,816

(22) Filed: Mar. 15, 2021

(65) Prior Publication Data
US 2021/0282406 A1    Sep. 16, 2021

Related U.S. Application Data

(60) Provisional application No. 62/989,337, filed on Mar. 13, 2020.

(51) Int. Cl.
*A01N 65/22*    (2009.01)
*A01N 37/16*    (2006.01)

(52) U.S. Cl.
CPC .............. *A01N 65/22* (2013.01); *A01N 37/16* (2013.01)

(58) Field of Classification Search
None
See application file for complete search history.

(56) References Cited

U.S. PATENT DOCUMENTS

| | | |
|---|---|---|
| 6,313,073 B1 | 11/2001 | Farooqi et al. |
| 6,531,163 B1 | 3/2003 | Bessette et al. |
| 7,001,869 B2 | 2/2006 | Johnson |
| 7,201,926 B2 | 4/2007 | Fried et al. |
| 7,214,392 B2 | 5/2007 | D'Amelio, Sr. et al. |
| 7,238,726 B2 | 7/2007 | Bessette |
| 7,262,003 B2 | 8/2007 | Kumar et al. |

(Continued)

FOREIGN PATENT DOCUMENTS

| | | |
|---|---|---|
| CN | 1489454 A | 4/2004 |
| CN | 105028527 A * | 11/2015 |

(Continued)

OTHER PUBLICATIONS

Isik et al.( Allelopathic potential of some essential oil bearing plant extracts on common lambsquarters (*Chenopodium album* L.), Revista de Chimie (Bucharest, Romania), 2016, 67(3), 455-9. (Year: 2016).*

(Continued)

*Primary Examiner* — Alton N Pryor
(74) *Attorney, Agent, or Firm* — McKee, Voorhees & Sease, PLC

(57) ABSTRACT

Provided are compositions and methods relating to herbicidal compositions. In particular, the invention relates to herbicidal compositions comprising a *Mentha* sp. plant extract composition that can be utilized alone or with other carvone and/or menthol or menthone containing plant extracts. Further, the composition acts in synergy with commercial herbicides. Also provided are methods of using herbicidal compositions for treatment of weeds, grasses, and photosynthetic organisms. In particular, the component acting in synergy with the commercial herbicide is a *Mentha* sp., and may also include dill, clove, caraway extract, and combinations thereof.

20 Claims, 11 Drawing Sheets

(56) References Cited

U.S. PATENT DOCUMENTS

| | | |
|---|---|---|
| 8,404,260 B2 | 3/2013 | Reid et al. |
| 8,802,594 B2 | 8/2014 | Sardo |
| 8,815,303 B2 | 8/2014 | Lewis |
| 8,877,219 B2 | 11/2014 | Bessette et al. |
| 8,906,431 B2 | 12/2014 | Baseeth |
| 8,945,597 B2 | 2/2015 | Zhong |
| 9,072,306 B2 | 7/2015 | Sardo |
| 9,079,152 B2 | 7/2015 | Markus et al. |
| 9,101,143 B2 | 8/2015 | Markus et al. |
| 9,247,751 B2 | 2/2016 | Bessette et al. |
| 9,339,030 B2 | 5/2016 | Burke et al. |
| 9,578,876 B2 | 2/2017 | Man et al. |
| 9,642,373 B2 | 5/2017 | Anderson |
| 9,949,490 B2 | 4/2018 | Lamb et al. |
| 9,974,753 B2 | 5/2018 | Salman et al. |
| 9,980,482 B2 | 5/2018 | Lisowsky et al. |
| 9,999,227 B2 | 6/2018 | Manhas et al. |
| 10,194,657 B2 | 2/2019 | Thomas et al. |
| 10,219,507 B1 | 3/2019 | Fewell, Jr. et al. |
| 2001/0055628 A1 | 12/2001 | Hsu et al. |
| 2002/0103084 A1 | 8/2002 | Hsu et al. |
| 2002/0193250 A1 | 12/2002 | Bessette |
| 2003/0186812 A1 | 10/2003 | Chattopadhyay et al. |
| 2003/0198696 A1 | 10/2003 | Keen |
| 2005/0019269 A1 | 1/2005 | Marks et al. |
| 2006/0141077 A1 | 6/2006 | Pettersson |
| 2006/0194698 A1 | 8/2006 | Gwinn et al. |
| 2007/0098750 A1 | 5/2007 | Bessette |
| 2007/0178128 A1 | 8/2007 | Bessette |
| 2008/0187607 A1 | 8/2008 | Bessette |
| 2008/0269177 A1 | 10/2008 | Bessette |
| 2011/0003694 A1 | 1/2011 | Sardo |
| 2011/0008475 A1 | 1/2011 | Sardo |
| 2012/0087987 A1 | 4/2012 | Man et al. |
| 2012/0171313 A1 | 7/2012 | Boone |
| 2013/0078296 A1 | 3/2013 | Grlica et al. |
| 2014/0335140 A1 | 11/2014 | Hoag et al. |
| 2015/0133296 A1 | 5/2015 | Ugalde Martinez et al. |
| 2015/0157027 A1 | 6/2015 | Harman |
| 2015/0223468 A1 | 8/2015 | Rodriguez Quintero |
| 2016/0309726 A1 | 10/2016 | Wilson |
| 2017/0079272 A1 | 3/2017 | Bristow et al. |
| 2017/0079278 A1 | 3/2017 | Rodriguez Quintero |
| 2017/0099833 A1 | 4/2017 | Essinger, Jr. et al. |
| 2017/0118998 A1 | 5/2017 | Bessette et al. |
| 2017/0215414 A1 | 8/2017 | Bond |
| 2017/0215433 A1 | 8/2017 | Yanez Reyes |
| 2017/0231231 A1 | 8/2017 | Enan |
| 2017/0238555 A1 | 8/2017 | Street et al. |
| 2017/0245493 A1 | 8/2017 | Gezundhait et al. |
| 2017/0303537 A1 | 10/2017 | Chia et al. |
| 2018/0303084 A1 | 10/2018 | Malki |
| 2018/0310570 A1 | 11/2018 | Castellón Mora et al. |
| 2018/0338501 A1 | 11/2018 | Pelah et al. |

FOREIGN PATENT DOCUMENTS

| | | | |
|---|---|---|---|
| CN | 107372642 A | * | 11/2017 |
| RU | 2698056 C1 | | 8/2019 |
| WO | 1999046994 A1 | | 9/1999 |
| WO | WO2000051436 A | * | 3/2000 |
| WO | 2003083028 A3 | | 10/2003 |
| WO | 2006094126 A2 | | 9/2006 |
| WO | 2016170531 A1 | | 10/2016 |
| WO | 2017220581 A1 | | 12/2017 |
| WO | 2018034877 A1 | | 2/2018 |
| WO | 2018055423 A1 | | 3/2018 |
| WO | 2018068774 A2 | | 4/2018 |
| WO | 2018167385 A1 | | 9/2018 |
| WO | 2018189610 A1 | | 10/2018 |
| WO | 2018206866 A1 | | 11/2018 |

OTHER PUBLICATIONS

Seidlova et al.( Bioherbicidal effects of peppermint (*Mentha piperita*) on selected weed species: a laboratory study), Biologia(Bratislava 1997, vol. 52, No. 1, pp. 85-90, 10 refs). (Year: 1997).*

Khare (Environmental Technology & Innovation (2019), vol. 14). (Year: 2019).*

Ibáñez et al., "Phytotoxicity of Essential Oils on Selected Weeds: Potential Hazard on Food Crops", Plants, vol. 7, No. 79, doi:10.3390/plants7040079, pp. 1-15, 2018.

Khare et al., "Impact of essential oils of *E. citriodora, O. basilicum* and *M. arvensis* on three different weeds and soil microbial activities", Environmental Technology & Innovation, vol. 14, 100343, pp. 1-14, 2019.

Mahdavikia et al., "Phytotoxic activity of essential oil and water extract of peppermint (*Mentha x piperita* L. CV. Mitcham)", Journal of Applied Research on Medicinal and Aromatic Plants, vol. 2, pp. 146-153, 2015.

Azirak et al., "Allelopathic effect of some essential oils and components on germination of weed species", Acta Agriculturae Scandinavica Section B-Soil and Plant Science, vol. 58, pp. 88-92, 2008.

Choi et al., "Evaluation of Herbicidal Potential of Essential Oils and their Components under In vitro and Greenhouse Experiments", Weed Turf. Sci., vol. 4, Issue 4, http://dx.doi.org/10.5660/WTS.2015.4.4.321, pp. 321-329, 2015.

Gouda et al., "Pre and Post Herbicidal Activity of Monoterpenes against Barnyard Grass (*Echinochloa crus-galli*)", Weed Science, vol. 64, pp. 191-200, 2016.

Önen et al., "Bioherbicidal effects of some plant essential oils on different weed species", Journal of Plant Diseases and Protection Sonderheft XVIII, pp. 597-605, 2002.

Sarheed Mohammed Mahmood, "Allelopathic compounds from Mint target the cytoskeleton from cell biology towards application as bioherbicides", Karlsruher Institute of Technology, KIT, pp. 1-113, Oct. 17, 2019.

Snoussi et al., "Mentha spicata Essential Oil: Chemical Composition, Antioxidant and Antibacterial Activities against Planktonic and Biofilm Cultures of *Vibrio* spp. Strains", Molecules, vol. 20, doi:10.3390/molecules200814402, pp. 14402-14424, 2015.

Gillilan, JoAnna, "Improvement of U.S. EPA Minimum Risk Essential Oils' Pesticide Activity Through Surfactant Enhancement and Synergy", Dissertation, The Ohio State University, pp. 1-177, 2012.

Mishra et al., "Assessing essential oil components as plant-based preservatives against fungi that deteriorate herbal raw materials", International Biodeterioration & Biodegradation, vol. 80, pp. 16-21, 2013.

* cited by examiner

HERBICIDAL *MENTHA* PANTSD, EXTRACT COMPOSITIONS AND METHODS OF USING SAME000000000000000,001

CROSS REFERENCE TO RELATED APPLICATIONS

This application claims priority to provisional application U.S. Ser. No. 62/989,337, filed Mar. 13, 2020, which is incorporated herein by reference in its entirety.

FIELD OF THE INVENTION

The invention relates generally to the field of herbicides. In particular, the invention relates to composition which contain a *Mentha* sp. extract which acts alone or with other carvone and/or menthol or menthone containing plant extracts and/or in combination with one or more other synthetic or organic herbicides and methods of using the herbicidal compositions for pre or post treatment which work synergistically with the *Mentha* sp. extract.

BACKGROUND OF THE INVENTION

New herbicide discovery and development involves identifying a biochemical and/or physiological plant site to disrupt physiological and/or enzymatic function. Plants will die from the lack of biochemical compounds, which would no longer be synthesized, or from a buildup of chemical species which are detrimental to the plant, for example superoxides, peroxides, and/or free radicals. The last new mode of action herbicide to be developed was in the 1980s. It has been nearly impossible to discover new sites and modes of herbicide action which control problem weeds, are cost-effective, have tolerance to existing crops, have a sufficiently environmental and toxicology profile, and that may be used in corn, soybean, rice, and cereal crops.

Many herbicides are derived from petroleum sources and synthesized throughout the world, shipped to the US for formulation and use. There have been global efforts to reduce the dependence on petroleum sources and to increase environmental sustainability across all industries. One such way in herbicides may be using a plant derived solution to replace petroleum synthetic-synthesized or derived herbicide compounds. These potentially carbon and nitrogen neutral products, which may be grown by farmers for use on their own crops would also reduce the environmental impact of shipping overseas.

A growing number of weeds are now resistant to multiple herbicide modes of action and sites of action. Two of the methods in which weeds may gain herbicidal resistance are compartmentalization, which sequesters the herbicide within the plant, and metabolic resistance, which leads to the breakdown of the herbicide, and may render the weeds tolerant and/or resistant to many classes of herbicides. As metabolic resistance to herbicides allows the weed to degrade the herbicides which are applied to the weeds into compounds which are no longer herbicidal the weed may become resistant to not only that specific compound, but to nearly all herbicides belonging to the same class of herbicide.

Therefore, there is a need for new herbicides which are market viable and may be more environmentally friendly and rely less upon petroleum sources.

SUMMARY

Applicants have identified novel herbicidal compositions comprising compounds obtained from and found in extracts of *Mentha* sp., such as *M. piperata* (peppermint), *M. spicata* (spearmint) and *M. arvensis* (corn mint) or combinations thereof. These compositions in embodiments can include carvone (R,S) containing oils and/or other menthol, menthone, 1,8-cineole, limonene(R,S) containing oils and may in embodiments include extracts of *Carum carvi* (caraway), *Syzygium aromaticum* (clove), *Anehum graveolens* (dill), or combinations thereof. In embodiments, application of the compositions may be applied prior to or after emergence of plants. With the compositions provided, there is increased herbicidal effect on plants compared to the herbicidal effect when the extracts are applied separately. Further, there is shortened time to herbicidal effect on plants compared to time for herbicidal effect when the extracts are applied separately. In embodiments, the plant extract composition may be combined with one or more other synthetic or organic herbicide(s). A synergistic herbicidal effect is obtained when combined with the one or more non-*Mentha* herbicides, in which the herbicidal effect is increased compared to application of the non-*Mentha* herbicide alone. In further embodiments, the herbicidal effect on plants tolerant or resistant to herbicides is increased when the composition is combined with the herbicide. The ability of such tolerant plants to detoxify herbicides and xenobiotics is reduced when using the extract with or without the addition of carvone(R,S) containing oils and/or other menthol, menthone, 1,8-cineole, limonene(R,S) containing oils. Examples, without intending to be limiting, of plants having high amounts of carvone(R,S) containing oils are *Carum carvi* (caraway), *M. spicata* (spearmint) and *Anehum graveolens* (dill). Embodiments provide for obtaining the same herbicidal effect on plants with reduced amounts of non-*Mentha* herbicide when combined with the *Mentha* herbicide composition. The composition when combined with an herbicide in one embodiment will have an increased herbicidal effect on a plant compared to application of the same amount of each compound to the plant applied separately.

In certain embodiments the herbicide composition is applied at a concentration of from about 1.0-gram active ingredient per hectare (g ai/ha), about 2.5 g ai/ha, about 5.0 g ai/ha, about 7.5 g ai/ha, about 10.0 g ai/ha, or about 12.5 g ai/ha up to about 15 kg ai/ha, about 20 kg ai/ha, about 40 kg ai/ha, or about 45 kg ai/ha. The composition may comprise a carrier, excipient or diluent.

DESCRIPTION OF THE FIGURES

FIG. 4A shows

*Cucumis sativus* control, FIG. 4B shows *Salvia farniacea* control, FIG. 4C shows *Tagetes patula* control, and FIG. 4D shows *Solanum lycopsersicum* control.

FIG. 5A shows *Cucumis sativus* control, FIG. 5B shows *Salvia farniacea* control, FIG. 5C shows *Tagetes patula* control, and FIG. 5D shows *Solanum lycopsersicum* control.

DETAILED DESCRIPTION

Figure 1:
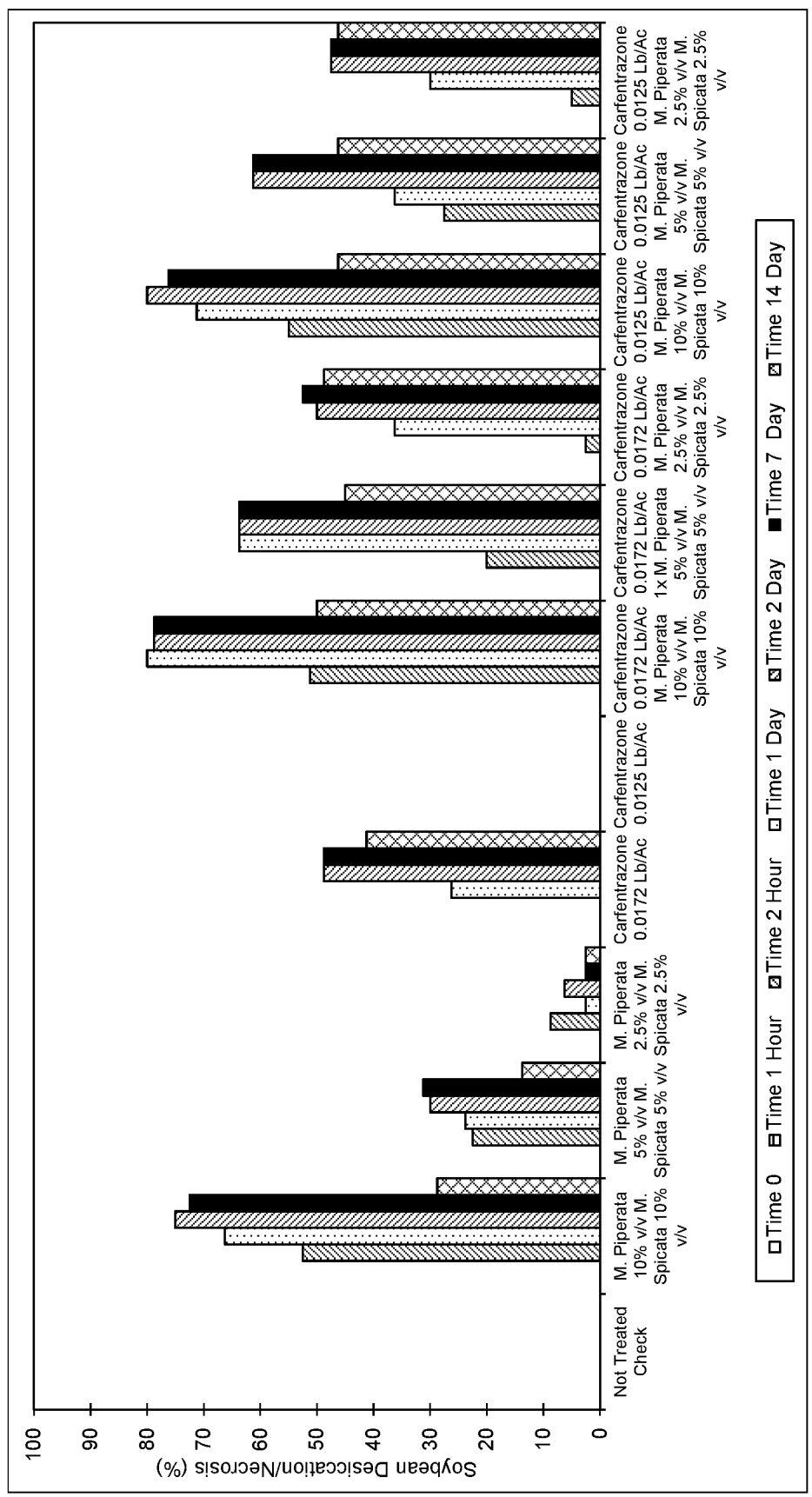
FIG. 1 shows soybean (glyphosate tolerant) desiccation, control, and leaf necrosis from treatment with essential oils alone and in unique combinations with synthetic herbicide Carfentrazone (protoporphyrinogen oxidase (PPO)-inhibitor). 0 to 14 days after treatment.

The present compositions and methods relate generally to the field of herbicidal compositions. In particular, herbicidal compositions which contain a plant extract and compositions with the plant extract in synergistic combination with another herbicide and methods of using the herbicidal compositions. The compositions and methods have many advantages over existing herbicidal compositions, including, for example, enhancing the control of weeds while reducing the amount of herbicides, eliminating herbicidal resistance in weeds, and being used for both pre- and post-emergence control. Shown here is a method that utilizes plant extracts in a new manner by disrupting multiple biochemical and signaling pathways and which in an embodiment enhances herbicidal effect of other herbicides and enhances the effect with herbicide resistant weeds or weeds difficult to control. The composition here can in an embodiment stop detoxification pathways and other pathways that allow for such resistant plants and provide a synergistic effect.

An aspect is to provide novel herbicidal compositions that contain *Mentha* plant extracts. The composition comprises extracts of *Mentha* sp., such as by way of example, *M. piperata* (peppermint), *M. spicata* (spearmint) and *M. arvensis* (corn mint) or combinations thereof. Peppermint has menthol/menthone/other beneficial chemicals, Spearmint has carvone/other beneficial chemicals. Another aspect of the present invention is the composition contains compounds comprising other carvone, other menthol, menthone, 1,8-cineole, or limonene(R,S) containing oils or a combination thereof. In additional to being present in *M. spicata*, carvone is also found in the other non-*Mentha* plant extracts. Carvone is an oily liquid terpenoid ketone $C_{10}H_{14}O$, found in many essential oils of plants, including, for example, *Carum carvi* (caraway), *M. spicata* (spearmint), and *Anehum graveolens* (dill).

In an embodiment, the herbicidal composition comprises an extract of *Mentha* sp., caraway, clove, dill, and/or combinations thereof and a solubilizer, such as but not limited to a surfactant or a salt, to allow the extract to be formulated as an aqueous solution. In an alternate embodiment, the composition comprises the extract and an adjuvant, such as but not limited to a surfactant, a pH buffering agent, or a crop or vegetable oil or concentrate, and/or combinations thereof. In another embodiment, the composition comprises the extract, a solubilizer, and an adjuvant. In preferred embodiments, the extract contains carvone, menthol, menthone, 1,8-cineole, or limonene(R,S) containing oil or a combination thereof.

The extract composition in an embodiment is combined with a carrier, excipient, surfactant and/or diluent appropriate for the process in which it will be used. The carrier, excipient and/or diluent is provided to provide improved properties of the composition, such as standardizing, preserving and stabilizing, or allowing for stability. There are a myriad of such agents available which may be added. Without intending to be limiting, examples include wetting agents and lubricating agents, preservative agents, lipids, stabilizers, solubilizers and emulsifiers.

Another aspect of the invention is to provide herbicidal compositions containing synergistic mixtures or blends of certain plant extracts with another herbicide. In some embodiments, the herbicidal composition comprises extracts and another non-*Mentha* herbicide. In a further embodiment, the extract and herbicide interact synergistically so the amount of extract and additional herbicide will have an increased herbicidal effect to a plant compared to application of the same amount of each compound to the plant applied separately. In embodiments the herbicide applied can be reduced and yet have the same impact as when not reduced, when combined with the *Mentha* composition, as described below. In preferred embodiments, the extract is a blend of *Mentha* sp., caraway, clove, dill, and/or combinations thereof.

In other embodiments, the compositions of the disclosure are formulated to provide a fast-acting, rapid defoliant and/or desiccant for pre-harvest applications.

In some other embodiments of the present disclosure, the compositions are selective herbicides that can be used to control certain broadleaf, grasses, aquatic, and photosynthesizing organisms without affecting desirable plant or biological matter.

An aspect is to provide a method for controlling broadleaf weed and grass growth by the application of the compositions of the present invention to a locus where such control is desired. The composition is contacted with a plant or plurality of plants, such as a crop. In an embodiment, the method is spraying an aqueous composition comprising an extract. In an embodiment, the method is spraying a non-aqueous composition comprising an extract. In a further embodiment, the aqueous composition or nonaqueous composition comprises an extract from *Mentha* sp., caraway, clove, dill, and/or combinations thereof and one or more other herbicides where the extract and herbicide work in synergy.

In other embodiments, the method is coating a plant, plant part, or seed before planting. In some embodiments, the compositions are applied before the weeds and grass emerge. In other embodiments, the compositions are applied after the weeds (a plant not desired to be grown in a particular area) emerge.

An aspect of the present invention is to provide a method for controlling aquatic plants, photosynthesizing organisms, broadleaf weed and grass growth by the application of the compositions using different excipients in the formulation of the extracts as well as surfactants and adjuvants in the application systems or in the formulation to enhance effectiveness of the mixtures. Embodiments provide for selectivity in herbicidal effect to grasses versus broadleaf or aquatic or other photosynthesizing organisms based upon the rate and effect of any added herbicides. In an embodiment, the method is spraying an aqueous composition or nonaqueous composition comprising an extract of the disclosure. In a further embodiment, the composition is an extract from *Mentha* sp., caraway, clove, dill, and/or combinations thereof and another herbicide where the extract enhances the control of the herbicide. In other embodiments, the method is coating a plant, plant part, or seed before planting. In some embodiments, the compositions are applied before the weeds and grass emerge. In other embodiments, the compositions are applied after the weeds emerge.

An aspect of the present invention is to provide a method for controlling weed seed germination and subsequent growth until the first true leaves are formed by the application of the compositions of the present invention to a locus where such control is desired. In an embodiment, the method is spraying an aqueous composition or nonaqueous composition comprising an extract of the disclosure. In a further embodiment, the composition is an extract from *Mentha* sp., caraway, clove, dill, and/or combinations thereof and another herbicide where the extract enhances the control of the herbicide. In other embodiments, the method is coating a plant, plant part, or seed before planting.

Additional aspects of the present invention to provide a novel herbicide that is low in environmental and mammalian toxicity and can be used in conjunction with conventional pesticides, including but not limited to herbicides. In some embodiments, the composition is a safe, non-toxic herbicidal composition. In further embodiments, the composition is comprised of food grade or raw extract materials and is exempt from U.S. Environmental Protection Agency registration.

An aspect of the present invention to provide a novel herbicide that provides a new site(s) of action and/or new mode of action for disruption of plant physiology/biochemistry which leads to the death or severe injury and growth cessation of the treated plant. In an embodiment, an extract of the disclosure disrupts metabolic and detoxification pathways.

An aspect of the present invention is a novel treatment that provides a disruption of plant physiology/biochemistry directly relating to the removal of xenobiotic chemicals in or within the plant. The addition of the extracts (or combination of extracts and one or more synthetic or organic herbicides) stop or retard the ability of the plant to remove herbicides or xenobiotics from the plant/photosynthesizing organism which leads to the death or severe injury and/or growth cessation of the treated plant which can be used in conjunction with conventional pesticides, including but not limited to herbicides.

An aspect of the present invention is to provide a synergist for synthetic and natural (organic) herbicides, plant growth regulators, and biological based compounds which impact plant physiology, thereby providing enhanced necrology/desiccation of plant matter coupled with systemic action on roots, shoots, seeds, while using lower rates of conventional pesticides.

An aspect of the present invention is a non-systemic or contact enhanced herbicide that can be used alone or in combination with synthetic, organic, or inorganic (salts) mixtures to remove leaf or green plant matter without affecting the stem of the plants.

An aspect of the invention is an herbicidal composition and method to which photosynthesizing organisms, broadleaf weeds, and unwanted grasses will impede the resistance to the aforementioned mixtures. The mixtures of the disclosure have no known resistance in plants or in photosynthesizing organisms.

The above and other aspects are accomplished by the present invention which is directed to herbicidal compositions containing certain plant extracts and herbicidal compositions containing synergistic mixtures or blends of certain plant extracts.

The present invention is directed to a method for controlling aquatic, photosynthesizing organisms, broadleaf weeds, and unwanted grasses by applying a pesticidally-effective amount of the above herbicidal compositions to a locus where weed control is desired.

Another aspect of the present invention is a novel herbicide that is comprised of food grade materials and is exempt from tolerance under the U.S. Federal Food and Drug Cosmetic Act.

An herbicidal composition is provided that has a pleasant scent and that can be applied without burdensome safety precautions. The compositions and methods of use as described above which can be inexpensively produced or employed.

The embodiments of this invention are not limited to particular compositions or methods, which can vary and are understood by skilled artisans. It is further to be understood that all terminology used herein is for the purpose of describing particular embodiments only and is not intended to be limiting in any manner or scope. For example, as used in this specification and the appended claims, the singular forms "a," "an," "the," and "another" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾ This applies regardless of the breadth of the range.

Definitions

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring techniques and equipment, with respect to any quantifiable variable, including, but not limited to moles, reduction, mass, weight, and the like. Further, given solid and liquid handling procedures used in the real world, there is certain inadvertent error and variation that is likely through differences in the manufacture, source, or purity of the ingredients used to make the compositions or carry out the methods and the like. The term "about" also encompasses amounts that differ due to different equilibrium conditions for a composition resulting from a particular initial mixture. The term "about" also encompasses these variations. Whether or not modified by the term "about," the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

The term plant or plant material or plant part is used broadly herein to include any plant at any stage of development, or to part of a plant, including a plant cutting, a plant cell, a plant cell culture, a plant organ, a plant seed, and a plantlet. A plant cell is the structural and physiological unit of the plant, comprising a protoplast and a cell wall. A plant cell can be in the form of an isolated single cell or aggregate of cells such as a friable callus, or a cultured cell, or can be part of a higher organized unit, for example, a plant tissue, plant organ, or plant. Thus, a plant cell can be a protoplast, a gamete producing cell, or a cell or collection of cells that can regenerate into a whole plant. As such, a seed, which comprises multiple plant cells and is capable of regenerating into a whole plant, is considered a plant cell for purposes of this disclosure. A plant tissue or plant organ can be a seed, protoplast, callus, or any other groups of plant cells that is organized into a structural or functional unit. Particularly useful parts of a plant include harvestable parts and parts useful for propagation of progeny plants. A harvestable part of a plant can be any useful part of a plant, for example, flowers, pollen, seedlings, tubers, leaves, stems, fruit, seeds, roots, and the like. A part of a plant useful for propagation includes, for example, seeds, fruits, cuttings, seedlings, tubers, rootstocks, and the like.

As used herein, the term "plant tissue" includes differentiated and undifferentiated tissues of plants including those present in roots, shoots, leaves, pollen, seeds and tumors, as well as cells in culture (e.g., single cells, protoplasts, embryos, callus, etc.). Plant tissue may be in planta, in organ culture, tissue culture, or cell culture.

As used herein, "target" broadly refers to any biological surface or area of land and/or water which may benefit from weed, grass, or photosynthetic organism reduction and/or treatment.

As used herein, "treating" or "treatment" refers to the use of the compositions of the invention to eradicate, reduce, remove weeds, grasses, or photosynthetic organisms.

As used herein, the term "substantially free" refers to compositions completely lacking the component or having such a small amount of the component that the component does not affect the performance of the composition. The component may be present as an impurity or as a contaminant and shall be less than 0.5 wt. %. In another embodiment, the amount of the component is less than 0.1 wt. % and in yet another embodiment, the amount of component is less than 0.01 wt. %.

The terms "water soluble" and "water dispersible" as used herein, means that the compound is soluble or dispersible in water in the inventive compositions. In general, the polymer should be soluble or dispersible at 25° C. at a concentration of 0.0001% by weight of the water solution and/or water carrier, preferably at 0.001%, more preferably at 0.01% and most preferably at 0.1%.

The term "weight percent," ".%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt. %," etc.

It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged and configured, constructed and arranged, adapted and configured, adapted, constructed, manufactured and arranged, and the like.

The present composition and methods may be used for any plant species, whether monocotyledonous or dicotyledonous, including but not limited to corn (*Zea mays*), canola (*Brassica napus, Brassica rapa* ssp.), alfalfa (*Medicago sativa*), rice (*Oryza sativa*), rye (*Secale cereale*), sorghum (*Sorghum bicolor, Sorghum vulgare*), sunflower (*Helianthus annuus*), wheat (*Triticum aestivum*), soybean (*Glycine max*), tobacco (*Nicotiana tabacum*), potato (*Solanum tuberosum*), peanuts (*Arachis hypogaea*), cotton (*Gossypium hirsutum*), sweet potato (*Ipomoea batatus*), cassava (*Manihot esculenta*), coffee (*Cofea* spp.), coconut (*Cocos nucifera*), pineapple (*Ananas comosus*), citrus trees (*Citrus* spp.), cocoa (*Theobroma cacao*), tea (*Camellia sinensis*), banana (*Musa* spp.), avocado (*Persea americana*), fig (*Ficus casica*), guava (*Psidium guajava*), mango (*Mangifera indica*), olive (*Olea europaea*), papaya (*Carica papaya*), cashew (*Anacardium occidentale*), macadamia (*Macadamia integrifolia*), almond (*Prunus amygdalus*), sugar beets (*Beta vulgaris*), oats(*Avena*), barley (*Hordeum*), vegetables, ornamentals, and conifers. Vegetables include tomatoes (*Lycopersicon esculentum*), lettuce (e.g., *Lactuca sativa*), green beans (*Phaseolus vulgaris*), lima beans (*Phaseolus limensis*), peas (*Lathyrus* spp.) and members of the genus *Cucumis* such as cucumber (*C. sativus*), cantaloupe (*C. cantalupensis*), and musk melon (*C. melo*). Ornamentals include azalea (*Rhododendron* spp.), hydrangea (*Macrophylla hydrangea*), hibiscus (*Hibiscus rosasanensis*), roses (*Rosa* spp.), tulips (*Tulipa* spp.), daffodils (*Narcissus* spp.), petunias (*Petunia hybrida*), carnation (*Dianthus caryophyllus*), poinsettia (*Euphorbia pulcherrima*), and chrysanthemum. Conifers which may be employed in practicing the present invention include, for example, pines such as loblolly pine (*Pinus taeda*), slash pine (*Pinus elliotii*), ponderosa pine (*Pinus ponderosa*), lodgepole pine (*Pinus contotta*), and Monterey pine (*Pinus radiata*); Douglas-fir (*Pseudotsuga menziesii*); Western hemlock (*Tsuga canadensis*); Sitka spruce (*Picea glauca*); redwood (*Sequoia sempervirens*); true firs such as silver fir (*Abies amabilis*) and balsam fir (*Abies balsamea*); and cedars such as Western red cedar (*Thuja plicata*) and Alaska yellow-cedar (*Chamaecyparis nootkatensis*).

As used herein, a "weed" is any undesired plant. A plant may be considered generally undesirable for agriculture or horticulture purposes or may be considered undesirable in a particular situation (for example, a crop plant of one species in a field of a different species, also known as a volunteer plant).

The methods may also be used in controlling invasive aquatic species. Examples, without intending to be limiting, of noxious aquatic species are *Azolla pinnata, Caulerpa taxifolia* (Mediterranean strain), *Eichhornia azurea, Hydrilla verticillate, Hygrophila polysperma, Ipomoea aquatica, Lagarosiphon major, Limnophila sessiliflora, Melaleuca quinquenervia, Monochoria hastate, Monochoria vaginalis, Ottelia alismoides, Sagittaria sagittifolia, Salvinia auriculata, Salvinia biloba, Salvinia herzogii, Salvinia molesta* and *Solanum tampicense*. Examples of land weeds include, without limitation, *Acacia nilotica, Ageratina adenophora, Ageratina riparia, Alternanthera sessilis, Amaranthus genus, Arctotheca calendula, Asphodelus fistulosis, Avena sterilis, Carthamus oxyacantha, Chrysopogon aciculatus, Commelina benghalensis, Crupina vulgaris, Digitaria scalarum, Digitaria velutina, Drymaria arenariodes, Emex australis, Emex spinose, Euphorbia terracina, Galega officinalis, Heracleum mantegazzianum, Imperata brasiliensis, Imperata cylindrica, Inula Britannica, Ischaemum rugosum, Leptochloa chinensis, Lycium ferocissimum, Lygodium flexuosum, Lygodium microphyllum, Melastoma malabathricum, Mikania cordata, Mikania micrantha, Mimosa invisa, Mimosa pigra, Moraea collina, Moraea flaccida, Moraea miniate, Moraea ochroleuca, Moraea pallida, Nassella trichotoma, Onopordum acaulon, Onopordum Illyricum, Opuntia aurantiaca, Oryza longistaminata, Oryza punctate, Oryza rufipogon, Paspalum scrobiculatum, Pennisetum clandestinum, Pennisetum macrourum, Pennisetum pedicellatum, Pennisetum polystachion, Prosopis genus, Rottboellia cochinchinensis Rubus fruticosis Rubus moluccanus Saccharum spontaneum Sagittaria sagittifolia Salsola vermiculata Senecio inaequidens Senecio madagascariensis, Setaria pumila* ssp. *pallidefusca* (Now: ssp. *subtesselata*), *Solanum torvum Solanum viarum, Spermacoce alata, Tridax procumbens*, and *Urochloa panicoides*.

Compositions

The herbicidal compositions comprise one or more compounds selected from R-(−)-carvone, S-(+)-carvone, menthol, menthone, pulegone, (R)-(+)-limonene, (S)-(−)-limonene, 1,8-cineole, myrcene, and pinenes. Preferably, the compounds are from a natural source such as a plant extract. The extracts are preferably from *Mentha* sp., clove, dill, and caraway, more preferably *Mentha* sp., and most preferably *Mentha spicata* (spearmint), *Mentha arvensis* (corn mint), *Mentha piperata* (peppermint), hybrids thereof, and/or combinations thereof. In some embodiments, the compounds are synthetic.

Use concentrations of the extract for preemergent treatment may be from about 1.0 g/ha, about 2.5 g/ha, about 5.0 g/ha, about 7.5 g/ha, about 10.0 g/ha, or about 12.5 g/ha up to about 15 kg/ha, about 20 kg/ha, about 40 kg/ha, or about 45 kg/ha; in further embodiments at a concentration of 0.1 kg/ha to about 1.25 kg/ha; about 1.0 kg/ha to about 4.0 kg/ha; about 3.0 kg/ha to about 9.0 kg/ha; about 9.0 kg/ha to about 17.0 kg/ha; about 15 kg/ha to about 25 kg/ha; at about 16.0 kg/ha to about 35 kg/ha; about 20 kg/ha to about 40 kg/ha; or about 20 kg/ha to about 45 kg/ha.

Use concentrations of the extract for post emergent treatment may be from about 1.0 g/ha, about 2.5 g/ha, about 5.0 g/ha, about 7.5 g/ha, about 10.0 g/ha, or about 12.5 g/ha up to about 15 kg/ha, about 20 kg/ha, about 40 kg/ha, or about 45 kg/ha; in further embodiments at a concentration of 0.1 kg/ha to about 1.25 kg/ha; about 1.0 kg/ha to about 4.0 kg/ha; about 3.0 kg/ha to about 9.0 kg/ha; about 9.0 kg/ha to about 17.0 kg/ha; about 15 kg/ha to about 25 kg/ha; at about 16.0 kg/ha to about 35 kg/ha; about 20 kg/ha to about 40 kg/ha or about 20 kg/ha to about 45 kg/ha.

In still further embodiments herbicidal effect is seen at 1 g/ha up to 1 kg/ha for pre and/or post emergent applications. While small amounts such as 1 gram per hectare are effective, when the extract composition is used alone and without other additional herbicides, amounts at least about 100 times more are more effective.

When combined with a non-*Mentha* herbicide, the extract may be added from about 1.0 g/ha, about 2.5 g/ha, about 5.0 g/ha, about 7.5 g/ha, about 10.0 g/ha, or about 12.5 g/ha up to about 15 kg/ha, about 20 kg/ha, or about 35 kg/ha; in further embodiments at a concentration of 0.1 kg/ha to about 1.25 kg/ha; about 1.0 kg/ha to about 4.0 kg/ha; about 3.0 kg/ha to about 9.0 kg/ha; about 9.0 kg/ha to about 17.0 kg/ha; about 15 kg/ha to about 25 kg/ha; or at about 16.0 kg/ha to about 35 kg/ha.

The compositions may also contain an additional herbicide. When additional herbicides are included, the extract and the herbicide will act in synergy by increasing the effectiveness of the additional herbicide. In an embodiment the herbicidal effect is increased in a synergistic manner when combined with one or more non-*Mentha* synthetic or organic herbicide(s). The increased herbicidal effect may be up to 2×, 3×, 4×, 5×, 6×, 7×, 8×, 9× 10×, 20×, 25×, 30×, 35×, 40×, 50× or more or amounts in-between compared to the herbicidal effect when using the non-*Mentha* herbicide alone. In further embodiments the herbicide may be used in an amount less than when used without the *Mentha* composition to achieve the same herbicidal effect. The amount may be less than the manufacturer or distributor labeling instructions of the non-*Mentha* herbicide. The herbicide may be included in amounts from about 0.01% v/v to about 50% v/v 20% to about 70% less than when the *Mentha* herbicide composition is used and achieve the same degree of herbicidal effect. In further embodiments the amount reduced can be from about 25% to about 60% less, or from about 25% to about 50% less.

Still further embodiments provide for "breaking" of plant resistance/tolerance to an herbicide as described further herein. The combination of the *Mentha* composition with the non-*Mentha* herbicide provides for increased herbicidal effect on such resistant/tolerant plants and in embodiments is increased more than the effect of the *Mentha* composition and herbicide separately and what would be expected when such effects are combined. Put another way, the combination of the *Mentha* and non-*Mentha* herbicide increases herbicidal effect on such plants in a manner that is more than additive.

The compositions may further include carriers/solubilizers, adjuvants, stabilizers, emulsifiers, desiccants, defoliant, a pH agent, and/or combinations thereof in sufficient amounts to be effective. The active compound content of the application forms prepared from the formulations may vary within wide ranges. The additional functional ingredients of the application forms may be situated typically between about 0.01 wt. % and about 95 wt. %, between 0.01 wt. % and 50 wt. % by weight, between 0.01 wt. % and about 25 wt. %, and between about 0.01 wt. % and 15 wt. %, depending on the desired use and function of the herbicidal composition.

The above-described compositions may also be made as concentrates to be diluted at the above-reported concentrations for use. Such concentrates could be, for instance, at concentrations enabling a more practical storage and a convenient nx dilution (e.g., in water, or in an aqueous or nonaqueous carrier) for example in a 2×, 5×, 10×, 20×, 25×, 30×, 35×, 40×, 45×, 50×, etc., concentration.

In some embodiments, the compositions are comprised of food grade or raw extract materials and is exempt from U.S. Environmental Protection Agency registration. In other embodiments, the compositions are comprised of food grade materials and is exempt from tolerance under the U.S. Federal Food and Drug Cosmetic Act.

Extracts

Compounds found in plant extracts have unique site(s) of action and mode(s) of action for weed control pre- and post-emergence. For example, extracts containing carvone, such as in *Mentha*, preferably R-(−)-carvone (such as *M. spicata*), may act as an inhibitor of the mevalonate pathway in plants. The extracts may also contain other compounds useful in the compositions, including, but not limited to, menthol, menthone, pulegone, limonene, 1,8-cineole, myrcene, and/or pinenes. These extracts include, but are not limited to, *Mentha* sp., clove, dill, and caraway extracts. *Mentha piperata* and other extracts also have a series of compounds including menthol and menthone which disrupt plant membrane function, oxygen levels, and the plant cell ability to produce ATP and photosynthetic materials. Preferable the extract is a *Mentha* sp. More preferably the extract is from *Mentha spicata* (spearmint), *Mentha arvensis* (corn mint), *Mentha piperata* (peppermint), hybrids thereof, and/or combinations thereof.

Without being bound by a particular theory, it is believed that the compounds in extracts, due to their interaction with metabolic pathways, membrane functions, and other cellular activities, will act as an enhancer of other herbicides. For example, because the extracts interfere with membrane function, they may facilitate transport of the herbicide into the target cells. This same action may also prevent the compartmentalization of the herbicide within the target cells. Optionally, due to their interference with metabolic pathways, they may prevent the cells of the target photosynthetic organism from breaking down the herbicide, making lower dosages of the herbicide more effective.

*Mentha spicata* contains (R-(−)-carvone) which is an inhibitor of the Mevalonate pathway in plants. *Mentha spicata* also contains a series of other compounds (see table below) which have herbicidal impacts on plants.

*Mentha piperata* is an extract used. *Mentha piperata* have a series of compounds including menthol, menthone, and other (see table below) which disrupt plant membrane function, oxygen levels, and the plant cell ability to produce ATP and photosynthetic materials. The oil-extract from steam extraction produces a mixture of compounds including menthol, menthone, carvone, pulegone, and other terpenes natural products. The key components are menthol, menthone, pulegone, limonene, and R-(−)-carvone. There are advantages to combining *Mentha piperata* extract with *Mentha spicata* extract as there are additional compounds that enhance weed control that are not found in *Mentha piperata* extract. This herbicide formulation is active due to the combination of extracts found in the steam extraction of the plant. Singling out individual compounds for extraction and purification does not lend itself to a good herbicide.

Any method known in the art may be used to create the extracts. For example: steam extraction, solvent extraction, carbon dioxide extraction, maceration, enfleurage, cold press extraction, and/or water extraction may be used to create extraction have the above-mentioned compounds. Preferably the extraction method is steam extraction.

The extracts may have all or a limited number of the herbicidal (also referred to as weed controlling) compounds. Extracts may be combined to provide the weed controlling compounds in desired and/or efficacious concentrations or in concentrated form. The extracts may be used in liquid or solid form. The solid form may be formulated into granules or pellets.

The individual compounds may further be purified from the extract or the extract itself may be used in the compositions. Preferably the entire extract is used.

Carriers/Solubilizer

The extracts used in an embodiment have a hydrophobic phase and a carrier and/or solubilizer may be used in order for the extracts in certain delivery systems, such as aqueous sprayers. Useful carriers and/or solubilizers include, but are not limited to, surfactants and/or salts.

Surfactants

Nonionic Surfactants

In a particular aspect, nonionic surfactants are particularly useful for applications of use requiring additional defoaming. In an aspect, it is beneficial the compositions do not require formulation with the nonionic surfactant for low-foaming surface activity. However, in some aspects, a nonionic surfactant may be desired in combination with the compositions of the disclosure.

Nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amino group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water-soluble compound having the desired degree of balance between hydrophilic and hydrophobic properties. According to the disclosure, the nonionic surfactant useful in the composition is a low-foaming nonionic surfactant. Examples of nonionic surfactants useful in the present disclosure include:

1. Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available under the trade names Pluronic® and Tetronico manufactured by BASF Corp. Pluronic® compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from 1,000 to 4,000. Ethylene oxide is then added to sandwich this hydrophobe between hydrophilic groups, controlled by length to constitute from about 10% by weight to about 80% by weight of the final molecule. Tetronic® compounds are tetra-functional block copolymers derived from the sequential addition of propylene oxide and ethylene oxide to ethylenediamine. The molecular weight of the propylene oxide hydrotype ranges from 500 to 7,000; and, the hydrophile, ethylene oxide, is added to constitute from 10% by weight to 80% by weight of the molecule.

2. Condensation products of one mole of alkyl phenol wherein the alkyl chain, of straight chain or branched chain configuration, or of single or dual alkyl constituent, contains from 8 to 18 carbon atoms with from 3 to 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Rhone-Poulenc and Triton® manufactured by Dow.

3. Condensation products of one mole of a saturated or unsaturated, straight or branched chain alcohol having from 6 to 24 carbon atoms with from 3 to 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names Neodol® manufactured by Shell Chemical Co. and Alfonic® manufactured by Vista Chemical Co.

4. Condensation products of one mole of saturated or unsaturated, straight or branched chain carboxylic acid having from 8 to 18 carbon atoms with from 6 to 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade names Nopalcol® manufactured by Henkel Corporation and Lipopeg® manufactured by Lipo Chemicals, Inc.

5. Alkoxylated diamines produced by the sequential addition of propylene oxide and ethylene oxide to ethylenediamine. The hydrophobic portion of the molecule weighs from 250 to 6,700 with the central hydrophile including 0.1% by weight to 50% by weight of the final molecule. Examples of commercial compounds of this chemistry are available from BASF Corporation under the tradename Tetronic™ Surfactants.

6. Alkoxylated diamines produced by the sequential addition of ethylene oxide and propylene oxide to ethylenediamine. The hydrophobic portion of the molecule weighs from 250 to 6,700 with the central hydrophile including 0.1% by weight to 50% by weight of the final molecule. Examples of commercial compounds of this chemistry are available from BASF Corporation under the tradename Tetronic R™ Surfactants.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this disclosure for specialized embodiments. All of these ester moieties have one or more reactive hydrogen sites on their molecule which can undergo further acylation or ethylene oxide (alkoxide) addition to control the hydrophilicity of these substances.

Examples of Nonionic Low Foaming Surfactants Include:

Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from about 1,000 to about 3,100 with the central hydrophile including 10% by weight to about 80% by weight of the final molecule. These reverse Pluronics® are manufactured by BASF Corporation under the trade name Pluronic® R surfactants. Likewise, the Tetronic®R surfactants are produced by BASF Corporation by the sequential addition of ethylene oxide and propylene oxide to ethylenediamine. The hydrophobic portion of the molecule weighs from about 2,100 to about 6,700 with the central hydrophile including 10% by weight to 80% by weight of the final molecule.

Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to about 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics. Additional examples of effective low foaming nonionics include:

The alkylphenoxypolyethoxyalkanols of U.S. Pat. No. 2,903,486 issued Sep. 8, 1959 to Brown et al. and represented by the formula:

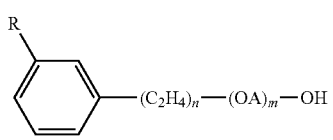

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548 issued Aug. 7, 1962 to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968 to Lissant et al. having the general formula $Z[(OR)_nOH]_z$ wherein Z is alkoxylatable material, R is a radical derived from an alkaline oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954 to Jackson et al. corresponding to the formula $Y(C_3H_6O)_n (C_2H_4O)_mH$ wherein Y is the residue of organic compound having from about 1 to 6 carbon atoms and one reactive hydrogen atom, n has an average value of at least about 6.4, as determined by hydroxyl number and m has a value such that the oxyethylene portion constitutes about 10% to about 90% by weight of the molecule.

The conjugated polyoxyalkylene compounds described in U.S. Pat. No. 2,674,619, issued Apr. 6, 1954 to Lundsted et al. having the formula $Y[(C_3H_6O_n (C_2H_4O)_mH]_x$ wherein Y is the residue of an organic compound having from about 2 to 6 carbon atoms and containing x reactive hydrogen atoms in which x has a value of at least about 2, n has a value such that the molecular weight of the polyoxypropylene hydrophobic base is at least about 900 and m has value such that the oxyethylene content of the molecule is from about 10% to about 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions of this disclosure correspond to the formula: $P[(C_3H_6O)_n (C_2H_4O)_mH]_x$ wherein P is the residue of an organic compound having from about 8 to 18 carbon atoms and containing x reactive hydrogen atoms in which x has a value of 1 or 2, n has a value such that the molecular weight of the polyoxyethylene portion is at least about 44 and m has a value such that the oxypropylene content of the molecule is from about 10% to about 90% by weight. In either case the oxypropylene chains may contain optionally, but advantageously, small amounts of ethylene oxide and the oxyethylene chains may contain also optionally, but advantageously, small amounts of propylene oxide.

Polyhydroxy fatty acid amide surfactants suitable for use in the present compositions include those having the structural formula $R_2CONR_1Z$ in which: R1 is H, $C_1$-$C_4$ hydrocarbyl, 2-hydroxy ethyl, 2-hydroxy propyl, ethoxy, propoxy group, or a mixture thereof; $R_2$ is a $C_5$-$C_{31}$ hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction, such as a glycityl moiety.

The alkyl ethoxylate condensation products of aliphatic alcohols with from about 0 to about 25 moles of ethylene oxide are suitable for use in the present compositions. The alkyl chain of the aliphatic alcohol can either be straight or branched, primary or secondary, and generally contains from 6 to 22 carbon atoms.

The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_6$-$C_{18}$ ethoxylated fatty alcohols with a degree of ethoxylation of from 3 to 50.

Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from about 6 to about 30 carbon atoms and a polysaccharide, e.g., a polyglycoside, hydrophilic group containing from about 1.3 to about 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

Fatty acid amide surfactants suitable for use the present compositions include those having the formula: $R_6CON(R_7)_2$ in which $R_6$ is an alkyl group containing from 7 to 21 carbon atoms and each $R_7$ is independently hydrogen, $C_1$-$C_4$ alkyl, $C_1$-$C_4$ hydroxyalkyl, or $-(C_2H_4O)_xH$, where x is in the range of from 1 to 3.

A useful class of nonionic surfactants include the class defined as alkoxylated amines or, most particularly, alcohol alkoxylated/aminated/alkoxylated surfactants. These nonionic surfactants may be at least in part represented by the general formulae: $R^{20}-(PO)_SN-(EO)_tH$, $R^{20}-(PO)_SN-(EO)_tH(EO)_uH$, and $R^{20}-N(EO)_tH$; in which $R^{20}$ is an alkyl, alkenyl or other aliphatic group; or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula: $R^{20}-(PO)_V-N[(EO)_wH][(EO)_zH]$ in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants. A preferred chemical of this class includes Surfonic® PEA 25 Amine Alkoxylate. Preferred nonionic surfactants for the compositions of the disclosure include alcohol alkoxylates, EO/PO block copolymers, alkylphenol alkoxylates, and the like.

The treatise Nonionic Surfactants, edited by Schick, M. J., Vol. 1 of the Surfactant Science Series, Marcel Dekker, Inc., New York, 1983 is an excellent reference on the wide variety of nonionic compounds generally employed in the practice of the present disclosure. A typical listing of nonionic classes, and species of these surfactants, is given in U.S. Pat. No. 3,929,678 issued to Laughlin and Heuring on Dec. 30, 1975. Further examples are given in "Surface Active Agents and detergents" (Vol. I and II by Schwartz, Perry and Berch).

Semi-Polar Nonionic Surfactants

The semi-polar type of nonionic surface-active agents are another class of nonionic surfactant useful in compositions of the present disclosure. Generally, semi-polar nonionics are high foamers and foam stabilizers, which can limit their application in CIP systems. However, within compositional embodiments of this disclosure designed for high foam cleaning methodology, semi-polar nonionics would have immediate utility. The semi-polar nonionic surfactants include the amine oxides, phosphine oxides, sulfoxides and their alkoxylated derivatives.

Amine oxides are tertiary amine oxides corresponding to the general formula:

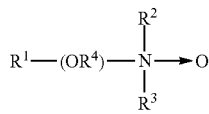

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of interest, $R^1$ is an alkyl radical of from about 8 to about 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkaline or a hydroxyalkylene group containing 2 to 3 carbon atoms; and n ranges from 0 to about 20.

Useful water soluble amine oxide surfactants are selected from the coconut or tallow alkyl di-(lower alkyl) amine oxides, specific examples of which are dodecyldimethylamine oxide, tridecyldimethylamine oxide, etradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide.

Useful semi-polar nonionic surfactants also include the water-soluble phosphine oxides having the following structure:

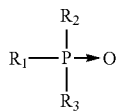

wherein the arrow is a conventional representation of a semi-polar bond; and, $R^1$ is an alkyl, alkenyl or hydroxyalkyl moiety ranging from 10 to about 24 carbon atoms in chain length; and, $R^2$ and $R^3$ are each alkyl moieties separately selected from alkyl or hydroxyalkyl groups containing 1 to 3 carbon atoms.

Examples of useful phosphine oxides include dimethyldecylphosphine oxide, dimethyltetradecylphosphine oxide, methylethyltetradecylphosphone oxide, dimethylhexadecylphosphine oxide, diethyl-2-hydroxyoctyldecylphosphine oxide, bis(2-hydroxyethyl)dodecylphosphine oxide, and bis(hydroxymethyl)tetradecylphosphine oxide.

Semi-polar nonionic surfactants useful herein also include the water-soluble sulfoxide compounds which have the structure:

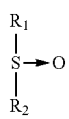

wherein the arrow is a conventional representation of a semi-polar bond; and, $R^1$ is an alkyl or hydroxyalkyl moiety of about 8 to about 28 carbon atoms, from 0 to about 5 ether linkages and from 0 to about 2 hydroxyl substituents; and $R^2$ is an alkyl moiety consisting of alkyl and hydroxyalkyl groups having 1 to 3 carbon atoms.

Useful examples of these sulfoxides include dodecyl methyl sulfoxide; 3-hydroxy tridecyl methyl sulfoxide; 3-methoxy tridecyl methyl sulfoxide; and 3-hydroxy-4-dodecoxybutyl methyl sulfoxide.

Semi-polar nonionic surfactants for the compositions of the disclosure include dimethyl amine oxides, such as lauryl dimethyl amine oxide, myristyl dimethyl amine oxide, cetyl dimethyl amine oxide, combinations thereof, and the like. Useful water soluble amine oxide surfactants are selected from the octyl, decyl, dodecyl, isododecyl, coconut, or tallow alkyl di-(lower alkyl) amine oxides, specific examples of which are octyldimethylamine oxide, nonyldimethylamine oxide, decyldimethylamine oxide, undecyldimethylamine oxide, dodecyldimethylamine oxide, iso-dodecyldimethyl amine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl) amine oxide, 3,6,9-trioctadecyldimethylamine oxide and 3-dodecoxy-2-hydroxypropyldi-(2-hydroxyethyl)amine oxide.

Suitable nonionic surfactants suitable for use with the compositions of the present disclosure include alkoxylated surfactants. Suitable alkoxylated surfactants include EO/PO copolymers, capped EO/PO copolymers, alcohol alkoxylates, capped alcohol alkoxylates, mixtures thereof, or the like. Suitable alkoxylated surfactants for use as solvents include EO/PO block copolymers, such as the Pluronic® and reverse Pluronic® surfactants; alcohol alkoxylates, such as Dehypon® LS-54 (R-(EO)$_5$(PO)$_4$) and Dehypon® LS-36 (R-(EO)$_3$(PO)$_6$); and capped alcohol alkoxylates, such as Plurafac® LF221 and Tegoten® EC11; mixtures thereof, or the like.

Anionic Surfactants

Also useful in the present invention are surface active substances which are categorized as anionics because the charge on the hydrophobe is negative; or surfactants in which the hydrophobic section of the molecule carries no charge unless the pH is elevated to neutrality or above (e.g. carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility. As those skilled in the art understand, anionics are excellent detersive surfactants and are therefore favored additions to heavy duty detergent compositions.

Anionic sulfate surfactants suitable for use in the present compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule).

Anionic sulfonate surfactants suitable for use in the present compositions also include alkyl sulfonates, the linear and branched primary and secondary alkyl sulfonates, and the aromatic sulfonates with or without substituents.

Anionic carboxylate surfactants suitable for use in the present compositions include carboxylic acids (and salts), such as alkanoic acids (and alkanoates), ester carboxylic acids (e.g. alkyl succinates), ether carboxylic acids, sulfonated fatty acids, such as sulfonated oleic acid, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylglutamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula:

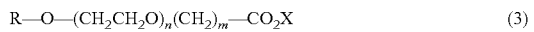

$$R—O—(CH_2CH_2O)_n(CH_2)_m—CO_2X \quad (3)$$

in which R is a $C_8$ to $C_{22}$ alkyl group or

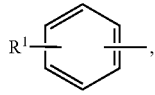

in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_8$-$C_{16}$ alkyl group. In some embodiments, R is a $C_{12}$-$C_{14}$ alkyl group, n is 4, and m is 1.

In other embodiments, R is

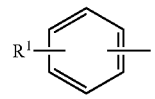

and $R^1$ is a $C_6$-$C_{12}$ alkyl group. In still yet other embodiments, $R^1$ is a $C_9$ alkyl group, n is 10 and m is 1.

Such alkyl and alkylaryl ethoxy carboxylates are commercially available. These ethoxy carboxylates are typically available as the acid forms, which can be readily converted to the anionic or salt form. Commercially available carboxylates include, Neodox 23-4, a $C_{12-13}$ alkyl polyethoxy (4) carboxylic acid (Shell Chemical), and Emcol CNP-110, a $C_9$ alkylaryl polyethoxy (10) carboxylic acid (Witco Chemical). Carboxylates are also available from Clariant, e.g. the product Sandopan® DTC, a $C_{13}$ alkyl polyethoxy (7) carboxylic acid.

Amphoteric Surfactants

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" *Cosmetics & Toiletries*, Vol. 104 (2) 69-71 (1989), which is herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the present invention generally have the general formula:

(MONO)ACETATE

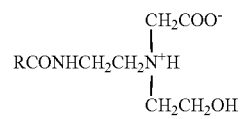

Neutral pH Zwitterion (DI)PROPIONATE

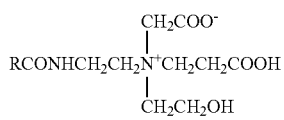

AMPHOTERIC SULFONATE

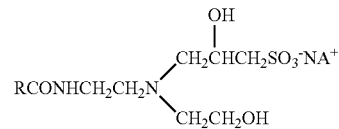

wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which $R=C_8-C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this invention include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)— NH—$CH_2$—$CH_2$—$N^+$($CH_2$—$CH_2$—$CO_2Na)_2$—$CH_2$—$CH_2$—OH or $C_{12}$-alkyl-C(O)—N(H)—$CH_2$—$CH_2$—$N^+$($CH_2$—$CO_2Na)_2$—$CH_2$—$CH_2$—OH. Disodium cocoampho dipropionate is one suitable amphoteric surfactant and is commercially available under the tradename Miranol™ FBS from Rhodia Inc., Cranbury, N.J. Another suitable coconut derived amphoteric surfactant with the chemical name disodium cocoampho diacetate is sold under the tradename Mirataine™ JCHA, also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated by reference in their entirety.

Zwitterionic Surfactants

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Betaine and sultaine surfactants are exemplary zwitterionic surfactants for use herein. A general formula for these compounds is:

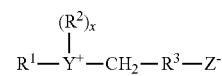

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2-hydroxyethyl)-N(2-hydroxydodecyl)ammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

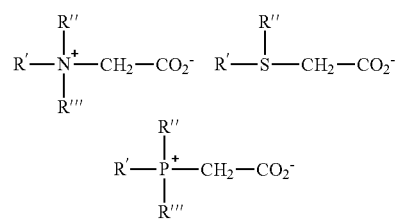

These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethyl-amidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the present invention include those compounds having the formula $(R(R^1)_2N^+R^2SO^{3-}$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated in their entirety.

The surfactant may also act as an adjuvant, and so the composition may be substantially free of additional adjuvants.

Salts

Any surface-active salt agent may also be used to solubilize the extracts. These salts include, but are not limited to, sulfonic acids and the salts or sulfonated esters. The salt forms of the surfactants may also be used as a carrier and/or solubilizer.

Adjuvant

An adjuvant may be added to improve the weed controlling activity or the application characteristics of the compositions of the invention. Adjuvants are broadly defined as either special purpose or activator adjuvants. Special purpose adjuvants generally widen the range of conditions under which a given herbicide formulation is useful, may alter the physical characteristics of the spray solution, and/or include compatibility agents, buffering agents, defoaming agents, and drift control agents. Activator adjuvants are commonly used to enhance postemergence herbicide performance, can increase herbicide activity, herbicide absorption into plant tissue, and rainfastness; may decrease photodegradation of the herbicide and/or may alter the physical characteristics of the composition. Activator adjuvants are generally surfactants, crop oil concentrates, nitrogen fertilizers, spreader-stickers, wetting agents, and penetrants.

Buffering Agent

Buffering agents usually contain a phosphate salt or citric acid, which maintains a slightly acid pH when added to alkaline compositions. These are added to higher pH compositions to prevent alkaline hydrolysis of susceptible compounds. Some buffering agents are also "water softening" agents that are used to reduce problems with hard water. In particular, calcium and magnesium salts found in hard water may interfere with the performance of certain compounds. Ammonium sulfate (AMS) is sometimes added to reduce hard water problems.

Defoamers

In embodiments of the disclosure, the compositions disclosed herein may include a defoaming agent. In an embodiment, the compositions disclosed herein include a defoaming agent. In a preferred embodiment, the defoaming agent is a nonionic surfactant. In a preferred embodiment, the defoaming agent is a nonionic alkoxylated surfactant. In another preferred embodiment, the defoaming agent is a nonionic surfactant having a formula RO—$(PO)_{0-5}(EO)_{1-30}$ $(PO)_{1-30}$, or RO—$(PO)_{1-30}(EO)_{1-30}$ $(PO)_{1-30}$, wherein R is a $C_{8-18}$ linear or branched alkyl group; EO=ethylene oxide; PO=propylene oxide. Exemplary suitable alkoxylated surfactants include ethylene oxide/propylene block copolymers (EO/PO copolymers), such as those available under the name Pluronic or Plurafac®, capped EO/PO copolymers, partially capped EO/PO copolymers, fully capped EO/PO copolymers, alcohol alkoxylates, capped alcohol alkoxylates, mixtures thereof, or the like.

Other defoaming agents may include silicone compounds such as silica dispersed in polydimethylsiloxane, polydimethylsiloxane, and functionalized polydimethylsiloxane such as those available under the name Abil B9952, fatty amides, hydrocarbon waxes, fatty acids, fatty esters, fatty alcohols, fatty acid soaps, ethoxylates, mineral oils, polyethylene glycol esters, alkyl phosphate esters such as monostearyl phosphate, and the like. A discussion of defoaming agents may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated by reference herein for all purposes.

Crop Oil Concentrate

Crop oils concentrates are petroleum based, for example paraffin or naphtha base, not vegetable derivative, a phytobland, nonaromatic oil of 70 to 110 second viscosity. Crop oils are 95 to 98 percent oil with 1 to 2 percent surfactant and/or emulsifier. Crop oils are believed to promote the penetration of pesticide spray through waxy cuticle of plants.

Crop oil concentrate contains 80 to 85 percent phytobland emulsifiable crop oil plus 15 to 20 percent nonionic surfactant. The purpose of the surfactant in this mixture is to emulsify the oil in the spray solution and lower the surface tension of the overall spray solution. Crop oil concentrates attempt to provide the penetration characteristics of the oil while capturing the surface tension reduction qualities of a surfactant. Crop oil concentrates may also aid in the solubility of the extract and/or other herbicides.

Vegetable oil concentrates are plant or vegetable-based oils that have been modified to increase their nonpolar or lipophilic characteristics. The most common method has been through esterification of common seed oils such as methylated sunflower, soybean, cotton, and linseed oils. Organosilicone-based methylated vegetable oil concentrates are also suitable. These adjuvants boast the surface tension-reducing properties of silicone but have the advantages of a methylated vegetable oil concentrate.

Nitrogen Fertilizers

Nitrogen fertilizers may be added as an adjuvant to increase herbicide activity. Without being bound by a particular theory, ammonium salts (NH+) appear to be the active component of these fertilizer solutions and may improve the performance on some weeds. Nitrogen fertilizers may replace surfactant or crop oil concentrate with some of the contact type herbicides. Therefore, in some embodiments the compositions are substantially free of surfactants and crop oil concentrates.

Spreader/Sticker

Any spreader/sticker known in the art may be added to the compositions and are used to aid in the retention of the composition to the target. Exemplary spreaders/stickers include, but are not limited to, the compounds of U.S. Pat. No. 9,456,600B2, herein incorporated by reference, petroleum distillates, and/or alkylphenol ethoxylates.

Wetting and Additional Agents

Any wetting agent known in the art may be added to the compositions are used to increase the spread of the compositions over a target. Wetting adjuvants may include mixtures of anionic and nonionic surfactants.

Agents which lower the volatility of the extracts may also be included in the composition. Examples, without intending to be limiting, include microcrystalline cellulose, encapsulation, and amino acids to stabilize the chemicals and lower loss due to heat or sunlight (which would include light shielding components like zinc oxide or montmorillonite clays). Amino acids may be alkaline or neutral and may also be combined with acidic amino acids.

Herbicides

Any herbicide that causes the desired result can be used. Herbicides are generally broken down into broad categories, including pre-plant herbicides, burndown herbicides, and post-emergence herbicides. Those of skill in the art appreciate the appropriate use of such compounds. There are several classes of post-emergent herbicides. These include: downwardly mobile herbicides, otherwise referred to as symplastically translocated, namely leaf to growing points such as auxin growth regulators, including phenoxy derivatives, benzoic acid derivatives, picolinic acid derivatives, amino acid inhibitors such as glyphosate, sulfosate, sulfonyl ureas, imidazolinones, sulfonanalides, pigment inhibitors, grass meristem destroyers, otherwise known as lipid biosynthesis inhibitors, such as aryloxyphenoxypropionates and cyclohexanediones, non-translocated or contact herbicides, including cell membrane destroyers, bipyridyliums, biphenyl ethers, or nitrophenyl ethers, upwardly mobile only herbicides, also known as apoplastically translocated, including photosynthetic inhibitors, such as triazines, uracils, phenylureas, or nitriles.

Examples of acid amide-based herbicides include Stam (3',4'-dichloropropionanilide, DCPA) and Alachlor (2-chloro-2',6'-diethyl-N-(methoxymethyl)-acetanilide). Examples of urea-based herbicides include DCMU (3-(3,4-dichlorophenyl)-1,1-dimethylurea) and rinuron (3-(3,4-dichlorophenyl)-1-methoxy-1-methylurea). Examples of sulfonyl urea-based herbicides include benzene sulfonamide (sold under the tradename penoxsulam), thifensulfuromnethyl(methyl-3-(4-methoxy-6-methyl-1,3,5-triazin-2-ylcarbamoylsulfamoyl)-2-tanoate) and flazesulfuron (1-(4,6-dimethoxy pyrimidin-2-yl)-3-(3-trifluoromethyl-2-pyridylsulfonyl)urea). Examples of dipyridyl-based herbicides include paraquat dichloride (1,1'-dimethyl-4,4'-bipyridinium dichloride) and diquat dibromide (6,7-dihydrodipyride[1,2-a:2',1'c]-pyrazinediium dibromide). One example of a diazine-based herbicide includes bromacil (5-bromo-3-sec-butyl-6-methyluracil). Examples of S-triazine-based herbicides include gesatop (2-chloro-4,6-bis(ethylamino)-1,3,5-triazine) and simetryn (2,4-bis(ethylamino)-6-methylthio-1,3,5-triazine). An example of nitrile-based herbicides includes DBN (2,6-dichlorobenzonitrile). Examples of dinitroaniline-based herbicides include trifluralin (α,α, α-trifluoro-2,6-dinitro-N,N-dipropyl-p-toluidine). Examples of carbamate-based herbicides include thiobencarb (S-p-chlorobenzyl diethylthiocarbamate) and MCC (methyl-3,4-dichlorocarbenylate). NIP (2,4-dichlorophenyl-p-nitro-phenyl ether) is an example of diphenyl ether-based herbicides. PCP (sodium pentachlorophenoxide) is an example of a phenol-based herbicide. MDBA (3,6-dichloro-2-methoxybenzoic acid dimethylamine salt) is an example of a benzoic acid-based herbicide. Examples of phenoxy-based herbicides include 2,4-D sodium salt (sodium 2,4-dichlorophenoxyacetate), 2,4-D Esters, and mapica (´-chloro-o-toluyOoxyJaceto-o-chloroanilide. Examples of organic phosphorus-based herbicides include Glyphosate (N-(phosphonomethyl) glycinate, bialaphos (sodium salt of L-2-amino-4-[(hydroxy(methyl)phosphinoyl]-butylyl-alanyl-N-alanine), and glufosinate (ammonium DL-homoalanin-4-yl(methyl) phosphinate). TCA sodium salt (sodium trichloronate) is an example of an aliphatic group-based herbicides. Hydrogen peroxide is another herbicide. In one embodiment, the herbicide used as the pesticide in the composition of the present invention is a dipyridyl-based herbicide or an organic phosphorus-based herbicides. In a further embodiment, the herbicide is an organic phosphorus-based herbicides.

Some of the herbicides that can be employed in conjunction with the compositions and methods described herein include, but are not limited to: 4-CPA; 4-CPB; 4-CPP; 2,4-D; 2,4-D choline salt, 2,4-D esters and amines, 2,4-DB; 3,4-DA; 3,4-DB; 2,4-DEB; 2,4-DEP; 3,4-DP; 2,3,6-TBA; 2,4,5-T; 2,4,5-TB; acetochlor, acifluorfen, aclonifen, acrolein, alachlor, allidochlor, alloxydim, allyl alcohol, alorac, ametridione, ametryn, amibuzin, amicarbazone, amidosulfuron, aminocyclopyrachlor, aminopyralid, amiprofosmethyl, amitrole, ammonium sulfamate, anilofos, anisuron, asulam, atraton, atrazine, azafenidin, azimsulfuron, aziprotryne, barban, BCPC, beflubutamid, benazolin, bencarbazone, benfluralin, benfuresate, bensulfuron-methyl, bensulide, benthiocarb, bentazon-sodium, benzadox, benzfendizone, benzipram, benzobicyclon, benzofenap, benzofluor, benzoylprop, benzthiazuron, bicyclopyrone, bifenox, bilanafos, bispyribac-sodium, borax, bromacil, bromobonil, bromobutide, bromofenoxim, bromoxynil, brompyrazon, butachlor, butafenacil, butamifos, butenachlor, buthidazole, buthiuron, butralin, butroxydim, buturon, butylate, cacodylic acid, cafenstrole, calcium chlorate, calcium cyanamide, cambendichlor, carbasulam, carbetamide, carboxazole, chlorprocarb, carfentrazone-ethyl, CDEA, CEPC, chlomethoxyfen, chloramben, chloranocryl, chlorazifop, chlorazine, chlorbromuron, chlorbufam, chloreturon, chlorfenac, chlorfenprop, chlorflurazole, chlorflurenol, chloridazon, chlorimuron, chlornitrofen, chloropon, chlorotoluron, chloroxuron, chloroxynil, chlorpropham, chlorsulfuron, chlorthal, chlorthiamid, cinidon-ethyl, cinmethylin, cinosulfuron, cisanilide, clethodim, cliodinate, clodinafop-propargyl, clofop, clomazone, clomeprop, cloprop, cloproxydim, clopyralid, cloransulam-methyl, CMA, copper sulfate, CPMF, CPPC, credazine, cresol, cumyluron, cyanatryn, cyanazine, cycloate, cyclosulfamuron, cycloxydim, cycluron, cyhalofop-butyl, cyperquat, cyprazine, cyprazole, cypromid, daimuron, dalapon, dazomet, delachlor, desmedipham, desmetryn, di-allate, dicamba, dichlobenil, dichloralurea, dichlormate, dichlorprop, dichlorprop-P, diclofopmethyl, diclosulam, diethamquat, diethatyl, difenopenten, difenoxuron, difenzoquat, diflufenican, diflufenzopyr, dimefuron, dimepiperate, dimethachlor, dimethametryn, dimethenamid, dimethenamid-P, dimexano, dimidazon, dinitramine, dinofenate, dinoprop, dinosam, dinoseb, dinoterb, diphenamid, dipropetryn, diquat, disul, dithiopyr, diuron, DMPA, DNOC, DSMA, EBEP, eglinazine, endothal, epronaz, EPTC, erbon, esprocarb, ethalfluralin, ethbenzamide, ethametsulfuron, ethidimuron, ethiolate, ethobenzamid, etobenzamid, ethofumesate, ethoxyfen, ethoxysulfuron, etinofen, etnipromid, etobenzanid, EXD, fenasulam, fenoprop, fenoxaprop, fenoxaprop-P-ethyl, fenoxaprop-P-ethyl+isoxadifen-ethyl, fenoxasulfone, fenteracol, fenthiaprop, fentrazamide, fenuron, ferrous sulfate, flamprop, flamprop-M, flazasulfuron, florasulam, fluazifop, fluazifop-P-butyl, fluazolate, flucarbazone, flucetosulfuron, fluchloralin, flufenacet, flufenican, flufenpyr-ethyl, flumetsulam, flumezin, flumiclorac-pentyl, flumioxazin, flumipropyn, flumeturon, fluorodifen, fluoroglycofen, fluoromidine, fluoronitrofen, fluothiuron, flupoxam, flupropacil, flupropanate, flupyrsulfuron, fluridone, flurochloridone, fluroxypyr, flurtamone, fluthiacet, fomesafen, foramsulfuron, fosamine, fumiclorac, furyloxyfen, glufosinate, glufosinate-ammonium, glufosinate-P-ammonium, glyphosate, halosafen, halosulfuron-methyl, haloxydine, haloxyfop-methyl, haloxyfop-P-methyl, hexachloroacetone, hexaflurate, hexazinone, imazamethabenz, imazamox, imazapic, imazapyr, imazaquin, imazosulfuron, imazethapyr, indanofan, indaziflam, iodobonil, iodomethane, iodosulfuron, iodosulfuron-ethyl-sodium, iofensulfuron, ioxynil, ipazine, ipfencarbazone, iprymidam, isocarbamid, isocil, isomethiozin, isonoruron, isopolinate, isopropalin, isoproturon, isouron, isoxaben, isoxachlortole, isoxaflutole, isoxapyrifop, karbutilate, ketospiradox, lactofen, lenacil, linuron, MAA, MAMA, MCPA esters and amines, MCPA-thioethyl, MCPB, mecoprop, mecoprop-P, medinoterb, mefenacet, mefluidide, mesoprazine, mesosulfuron, mesotrione, metam, metamifop, metamitron, metazachlor, metazosulfuron, metflurazon, methabenzthiazuron, methalpropalin, methazole, methiobencarb, methiozolin, methiuron, methometon, methoprotryne, methyl bromide, methyl isothiocyanate, methyldymron, metobenzuron, metobromuron, metolachlor, metosulam, metoxuron, metribuzin, metsulfuron, metsulfuron-methyl, molinate, monalide, monisouron, monochloroacetic acid, monolinuron, monuron, morfamquat, MSMA, naproanilide, napropamide, naptalam, neburon, nicosulfuron, nipyraclofen, nitralin, nitrofen, nitrofluorfen, norflurazon, noruron, OCH, orbencarb, ori zo-dichlorobenzene, orthosulfamuron, oryzalin, oxadiargyl, oxadiazon, oxapyrazon, oxasulfuron, oxaziclomefone, oxyfluorfen, paraflufenethyl, parafluron, paraquat, pebulate, pelargonic acid, pendimethalin, penoxsulam, pentachlorophenol, pentanochlor, pentoxazone, perfluidone, pethoxamid, phenisopham, phenmedipham, phenmedipham-ethyl, phenobenzuron, phenylmercury acetate, picloram, picolinafen, pinoxaden, pierophos, potassium arsenite, potassium azide, potassium cyanate, pretilachlor, primisulfuron-methyl, procyazine, prodiamine, profluazol, profluralin, profoxydim, proglinazine, prohexadione-calcium, prometon, prometryn, pronamide, propachlor, propanil, propaquizafop, propazine, propham, propisochlor, propoxycarbazone, propyrisulfuron, propyzamide, prosulfalin, prosulfocarb, prosulfuron, proxan, prynachlor, pydanon, pyraclonil, pyraflufen-ethyl, pyrasulfotole, pyrazogyl, pyrazolynate, pyrazosulfuron-ethyl, pyrazoxyfen, pyribenzoxim, pyributicarb, pyriclor, pyridafol, pyridate, pyriftalid, pyriminobac, pyrimisulfan, pyrithiobac-sodium, pyroxasulfone, pyroxsulam, quinclorac, quinmerac, quinoclamine, quinonamid, quizalofop, quizalofop-P-ethyl, rhodethanil, rimsulfuron, saflufenacil, S-metolachlor, sebuthylazine, secbumeton, sethoxydim, siduron, simazine, simeton, simetryn, SMA, sodium arsenite, sodium azide, sodium chlorate, sulcotrione, sulfallate, sulfentrazone, sulfometuron, sulfosate, sulfosulfuron, sulfuric acid, sulglycapin, swep, TCA, tebutam, tebuthiuron, tefuryltrione, tembotrione, tepraloxydim, terbacil, terbucarb, terbuchlor, terbumeton, terbuthylazine, terbutryn, tetrafluron, thenylchlor, thiazafluron, thiazopyr, thidiazimin, thidiazuron, thiencarbazone-methyl, thifensulfuron, thifensulfurn-methyl, thiobencarb, tiocarbazil, tioclorim, topramezone, tralkoxydim, triafamone, tri-allate, triasulfuron, triaziflam, tribenuron, tribenuron-methyl, tricamba, triclopyr choline salt, triclopyr esters and salts, tridiphane, trietazine, trifloxysulfuron, trifluralin, triflusulfuron, trifop, trifopsime, trihydroxytriazine, trimeturon, tripropindan, tritac tritosulfuron, vernolate, xylachlor and salts, esters, optically active isomers and mixtures thereof. In a still further embodiment, the herbicide is atrazine, bentazon, carfentrazone, fluazifop, glufosinate, glyphosate, halosulfuron, imazamox, mesotrione, pendimethalin, or topramezone.

When referring to an herbicidal effect or herbicidal action is meant to include damage to or death of a plant as a result of exposure to the herbicidal composition. Herbicidal effect varies depending upon the herbicide, rate of application, stage of plant growth, type of exposure and mode of action. Damage may manifest is visual or not visual ways, such as impact to foliage, shoots, flowers, fruits for example and may include necrosis, browning, reduced growth, poor or no gamete production or fruit quality, general and interveinal chlorosis, mottled chlorosis, yellow spotting, purpling of the leaves, necrosis, stem dieback and/or death of the plant. It may include defoliation or desiccation of plant tissue, leaf, root, shoot. This is useful in an embodiment in pre-harvest treatments or to remove leaves from plants (such as cotton) picking.

Desiccants

The extracts also work synergistically with desiccants to increase the effectiveness of the desiccant. Without being limited to a particular theory, it is thought that the extract enhances the uptake of the desiccant into the target plant. Chemical desiccants include, but are not limited to, activated alumina, aerogel, benzophenone, bentonite clay, calcium chloride, calcium oxide, calcium sulfate, cobalt(II) chloride, copper(II) sulfate, lithium chloride, lithium bromide, magnesium sulfate, magnesium perchlorate, phosphorous pentoxide, potassium carbonate, potassium hydroxide, silica gel, sodium, sodium chlorate, sodium chloride, sodium hydroxide, sodium sulfate, sucrose, and sulfuric acid.

Stabilizers

Stabilizers, such as low-temperature stabilizers, preservatives, antioxidants, light stabilizers or other agents which improve chemical and/or physical stability may also be present.

Furthermore, the formulations and application forms derived from them may also comprise, as additional auxiliaries, stickers such as carboxymethylcellulose, natural and synthetic polymers in powder, granule or latex form, such as gum arabic, polyvinyl alcohol, polyvinyl acetate, and also natural phospholipids, such as cephalins and lecithins, and synthetic phospholipids. Further possible auxiliaries include mineral and vegetable oils.

The extracts may contain volatile organic compounds and may exude a strong odor at certain temperatures. Stabilizers include, but are not limited to microcrystalline cellulose, encapsulation, amino acids to stabilize the chemicals and lower loss due to heat or sunlight. Examples include light shielding components like zinc oxide or montmorillonite clays.

Other

In embodiments of the invention, additional ingredients can be included in the weed controlling compositions. The additional ingredients provide desired properties and functionalities to the compositions. For the purpose of this application, the term "functional ingredient" includes a material that provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in herbicidal applications, specifically plant treatment applications. It is understood that the composition may include any of a variety of other useful components, and may be used with other systems that can kill or damage plants. These types of systems, by way of example, use may use genetic editing, such as RNAi (RNAi molecules directed to the EPSPS enzyme are an example), PGRs used to moderate or increase plant growth (ethephon is an example), and use of mechanical or electrical (electric charge to shock the soil) mechanisms of controlling weed growth or dyes or agents such as xanthene dyes that inhibit or disrupt plant cell light harvesting.

pH Agent

In some embodiments, the compositions of the present disclosure include an alkalinity source and/or acidulant as a pH agent. In a preferred embodiment, the compositions of the present disclosure include an acidulant. The acidulant can be effective to form a concentrate composition or a use solution with a desired acidic to neutral pH. The acidulant can be effective to form a use composition with pH of about 7, about 6 or less, about 5 or less.

In an embodiment, the acidulant includes an inorganic acid. Suitable inorganic acids include, but are not limited to, sulfuric acid, sodium bisulfate, phosphoric acid, nitric acid, hydrochloric acid. In some embodiments, the acidulant includes an organic acid. Suitable organic acids include, but are not limited to, methane sulfonic acid, ethane sulfonic acid, propane sulfonic acid, butane sulfonic acid, xylene sulfonic acid, benzene sulfonic acid, formic acid, acetic acid, mono, di, or tri-carboxylic acids (succinic, citric), picolinic acid, dipicolinic acid, and mixtures thereof. The acidulant may enhance herbicide uptake and performance.

According to some embodiments, the compositions include an alkalinity source. Exemplary alkalinity sources include alkali metal carbonates and/or alkali metal hydroxides. In various aspects, a combination of both alkali metal carbonates and/or alkali metal hydroxides are employed as the alkalinity source. The alkalinity source can be effective to form a use composition with pH of about 7, about 8 or more, about 9 or more, about 9, about 10 or more, about 10, about 11 or more, about 12 or more, about 13, or the like.

Alkali metal carbonates useful in the compositions may be for example and ash-based carbonate such as, but not limited to, sodium carbonate, sodium or potassium carbonate. In another embodiments, the alkali metal carbonates, and alkali metal hydroxides are further understood to include bicarbonates and sesquicarbonates. According to the compositions disclosed herein, any "ash-based" or "alkali metal carbonate" shall also be understood to include all alkali metal carbonates, bicarbonates and/or sesquicarbonates.

Alkali metal hydroxides may also be used in the compositions include, but are not limited to, sodium hydroxide, potassium hydroxide, and lithium hydroxide. Exemplary alkali metal salts include sodium carbonate, potassium carbonate, and mixtures thereof. The alkali metal hydroxides may be added to the composition in any form known in the art, including as solid beads, dissolved in an aqueous solution, or a combination thereof. Alkali metal hydroxides are commercially available as a solid in the form of prilled solids or beads having a mix of particle sizes ranging from about 12-100 U.S. mesh, or as an aqueous solution, as for example, as a 45% and a 50% by weight solution.

In addition to the first alkalinity source, the compositions may comprise a secondary alkalinity source. Examples of useful secondary alkaline sources include, but are not limited to, alkali metal silicates such as sodium or potassium silicate or metasilicate; alkali metal carbonates such as sodium or potassium carbonate, bicarbonate, sesquicarbonate; alkali metal borates such as sodium or potassium borate; and ethanolamines and amines. Such alkalinity agents are commonly available in either aqueous or powdered form, either of which is useful in formulating the present compositions.

An effective amount of one or more acidulant and/or alkalinity sources may be provided as an adjuvant. An effective amount is referred to herein as an amount that provides a use composition having a pH of at least about 5, preferably at least about 7, at least about 9, and at most 13. The use solution pH range is preferably between about 1 and about 13, about 5 and about 13, and more preferably between about 7 to 9. In addition, without being limited according to the compositions disclosed herein, all ranges recited are inclusive of the numbers defining the range and include each integer within the defined range.

Light Reducing Agent

In an aspect of the disclosure, compositions include a light reducing agent, also known as an anti-UV compound. The addition of such compounds slow the action of the active ingredients and promote better movement of the compositions throughout the plant and/or organism, thus increasing the effectiveness of the compositions according to the disclosure. Suitable compounds include, for example, p-Aminobenzoic acid, padimate O, phenylbenzimidazole sulfonic acid, cinoxate, dioxybenzone, oxybenzone, homosalate, menthyl anthranilate, octocrylene, octyl methoxycinnamate, octyl salicylate, sulisobenzone, trolamine salicylate, avobenzone, ecamsule, titanium dioxide, zinc oxide, 4-methylbenzylidene camphor, bisoctrizole, anisotraizine, tris-biphenyl triazine, bisimidazylate, drometrizole trisiloxane, benzophenone-9, octyl traizone, diethylamino hydroxybenzoyl butamido triazone, dimethico-diethylbenzalmalonate, isopentyl-4-methoxycinnamate, combinations thereof, and the like.

Formulations

Useful formulations include both liquid and solid compositions. Liquid compositions include solutions (including emulsifiable concentrates), suspensions, emulsions (including microemulsions, oil-in-water emulsions, flowable concentrates and/or suspoemulsions) and the like, which optionally can be thickened into gels. The general types of aqueous liquid compositions are soluble concentrate, suspension concentrate, capsule suspension, concentrated emulsion, microemulsion, oil-in-water emulsion, flowable concentrate and suspoemulsion. The general types of nonaqueous liquid compositions are emulsifiable concentrate, microemulsifiable concentrate, dispersible concentrate and oil dispersion.

The general types of solid compositions are dusts, powders, granules, pellets, prills, pastilles, tablets, filled films (including seed coatings) and the like, which can be water-dispersible ("wettable") or water-soluble. Films and coatings formed from film-forming solutions or flowable suspensions are particularly useful for seed treatment. Active ingredient can be (micro)encapsulated and further formed into a suspension or solid formulation; alternatively the entire formulation of active ingredient can be encapsulated (or "overcoated"). Encapsulation can control or delay release of the active ingredient. An emulsifiable granule combines the advantages of both an emulsifiable concentrate formulation and a dry granular formulation.

Methods of Use

Any method of administering to a target known in the art may be used to treat a target plant, field, or water source for controlling aquatic, photosynthesizing organisms, broadleaf weeds. Application can be any of a preplant incorporation, preemergence, over-lay treatments, tank mixtures, postemergence, selective application, and/or combinations thereof. In preplant incorporation, compositions in this group must be mixed into the surface soil before planting in order to achieve good weed control. Usually, herbicides that must be incorporated in the soil are highly volatile. Without incorporation, these herbicides would be lost into the air as a gas. In preemergence, the composition is usually applied immediately after planting. An over-lay treatment is a combination of a preplant incorporation into the soil and a preemergence treatment. Tank mixtures are generally aqueous compositions that are then introduced to a target area. For example, to target a field, the composition in the tank mixture may be sprayed over the area, or to target an aqueous environment the composition may be introduced to the water source. Postemergence is the application of the compositions after weeds have emerged from the soil and treatment is either a broadcast or directed fashion using an aqueous spray. Selective application may employ a rope wick or other wiper applicator that takes advantage of height differences between the weeds and other plants. Other methods may include coating, daubing, painting fogging, and/or combinations thereof.

In preferred embodiments, application is preplant incorporation, preemergence, over-lay, or postemergence treatment. In a more preferred embodiment, application is done through spraying an aqueous solution during pre- or postemergence.

All references and patent documents cited herein reflect the level of skill in the relevant arts and are incorporated by reference in their entireties to the extent there is no inconsistency with the present disclosure. The examples provided herein are for illustrative purposes and are not intended to limit the scope of the invention as claimed. Any variations in the exemplified compositions, plants and methods which occur to the skilled artisan are intended to fall within the scope of the present invention. Ultra-low volume applications of the *Mentha* extract composition, either alone or in combination with other components or herbicides may be utilized in certain embodiments. Application by air, such as with a drone or robot can be achieved where the concentration of the *Mentha* extract can be 0.01% v/v to 50% v/v. The extracts can function as a carrier solution for the application of crop protection compounds, including but not exclusive to herbicides from 2 liters to 20 liters per acre of application.

EXAMPLES

Example 1: Extracts

Steam extraction was performed on three *Mentha* sp. and analyzed for the presence of weed controlling compounds. Exemplary extract contents are summarized in Table 1. Precise levels of chemicals in the extracts can vary based on variety of mint plant or hybrids and environmental conditions.

TABLE 1

Mint Family Extract Contents and Comparison

| Chemical | | *Mentha spicata* % of extract | *Mentha arvensis* % of extract | *Mentha piperata* % of extract |
| --- | --- | --- | --- | --- |
| Menthol | Herbicidal | | 40 | 50 |
| Menthone | Herbicidal | | 20 | 25 |
| Carvone | Herbicidal | 60 | | |
| 1,8-Cineole | Herbicidal | 1 | | 5 |
| Methyl acetate | | | 3.5 | 5 |
| Menthofurane | | | | 5 |
| Caryophyllene | | 1 | | 2 |
| Pulegone | Herbicidal | | 2 | 2 |
| Limonene | Herbicidal | 20 | 5 | 2 |
| Myrcene | Herbicidal | 1 | | |
| Pinenes | Herbicidal | 2 | 3 | 1 |

As can be seen from Table 1, the different mint extracts contain weed controlling compounds in various quantities.

Example 2: Plant Control by Treatment of Seeds or Vegetative Tissue

In order to test the control of plants, *Mentha* sp. extracts alone or in combination with *Mentha* sp. and/or other essential oils were applied to seeds or vegetative tissue (leaves). In vivo laboratory and controlled environment assays:

Petri Dish. Seed impacts. Dishes layered with filter paper and filtered water added with various broadleaf and unwanted grass species to initiate germination. Conducted in the dark at 75/60° F. day night temperature with relative humidity at 50%. Seeds are allowed to imbibe water for 24 hours. The percent volume/volume of extract to water carrier is summarized above. The amount in mg/ml was calculated based on the percent of extract mixed with water. Plates have essential oil extracts added in a water carrying solution using a dose response treatment regime doubling the % v/v of extract in each successive treatment. Seeds have water added every two days. Seeds are monitored for 14 days following treatment. Plates are exposed to 12/12 hour day/night cycle after 7 days. Visual rating for germination, radicle, shoot, and root elongation are recorded. Commercial herbicides are also used at the US label recommended rate for treatment as a positive control. Not treated plates and seeds have only water used.

Vegetative tissue. Dishes layered with filter paper and filtered water added with various broadleaf and grass species to initiate germination. Conducted in the dark at 75/60 F day night temperature with relative humidity at 50%. Seeds are allowed to imbibe water for 24 hours. Seedlings are treated at 7 days after initiation of germination. Seedlings have essential oil extracts added in a water with methylated seed oil (MSO) is used as surfactant for vegetative tissue treatment (0.10% v/v) carrying solution using a dose response treatment regime doubling the mg/ml of extract in each successive treatment. Seeds have water added every two days. Seeds are monitored for 14 days following treatment. Plates are exposed to 12/12 hour day/night cycle after 7-14 days. Visual rating for tissue damage-injury, radicle, shoot, root elongation, color changes to the plant tissues are also recorded. Commercial herbicides are also used at the US label recommended rate for treatment as a positive control. Non-treated, control, plates and seeds have only water and MSO.

Micro well plates. Plates are sterile, filtered water added with various broadleaf and grass species to initiate germination. Conducted in the dark at 75/60 F day night temperature with relative humidity at 50%. Seeds are allowed to imbibe water for 24 hours. Plates have essential oil extracts added in a water carrying solution using a dose response treatment regime doubling as well as a Log dose response using mg/ml of extract in each successive treatment. Seeds, wells have water added every two days. Seeds are monitored for 14 days following treatment. Visual rating for germination, radicle, shoot, and root elongation are recorded. Commercial herbicides are also used at the US label recommended rate for treatment as a positive control. Not treated plates and seeds have only water used.

Potted soil. Commercial potting mix is used as a base with approximately 2 inches of 5% organic matter soil used on the top. Seeds are sown in the soil between 1 cm and 2.5 cm (as indicated by best practices for each plant-seed), filtered water added with various broadleaf and grass species to initiate germination. Conducted in the dark at 75/60 F day night temperature with relative humidity at 50%. Seeds are allowed to imbibe water for 24 hours. Plates have essential oil extracts added in a water carrying solution using a dose response treatment regime doubling as well as a Log dose response using mg/ml of extract in each successive treatment. Seeds, wells have water added every two days. Seeds are monitored for 14 days following treatment. Visual rating for germination, radicle, shoot, and root elongation are recorded. Commercial herbicides are also used at the US label recommended rate for treatment as a positive control. Not treated plates and seeds have only water used.

Established Plants

Control of plant by application to seeds or vegetative tissue (leaves) using *Mentha* sp. extracts alone or in combination with *Mentha* sp. and/or one or more synthetic or organic herbicidal compounds.

Petri Dish. Methods described above. Application of the treatment solutions done to emerged plant tissue.

Micro well plates. Methods described above. Application of the treatment solutions done to emerged plant tissue.

Potted plants. These assays are conducted in pots using a commercial potting media to establish broadleaf and grass plants with at least one true leaf. The cotyledons are not treated in these assays.

Results

As shown in Tables 2-5, ryegrass and Timothy was grown in the presence of extracts from *M. piperata* or *M. spicata* have a dose response reduction in germination as the concentration of the extract increases. Further, when comparing Tables 2 to 4 and 3 to 5, the different plants has an extract dependent response. *M. piperata* was more effective at limiting the germination of ryegrass at low levels when compared to *M. spicata*. Conversely, extracts of *M. spicata* inhibited the growth of Timothy to a greater extent than extracts of *M. piperata*. However, both extracts were able to significantly reduce germination down to 0.1%

TABLE 2

Seed Germination in Petri dishes

| TRT # | Dose % Mentha piperata | % Germination Ryegrass | |
|---|---|---|---|
| | | 2 Days | 4 Days |
| 1 | 50.00 | 0 | 0 |
| 2 | 25.00 | 0 | 0 |
| 3 | 1.00 | 1 | 0 |
| 4 | 0.10 | 1 | 1 |
| 5 | 0.00 | 60 | 60 |

TABLE 3

Seed Germination in Petri dishes

| TRT # | Dose % Mentha piperata | % Germination Timothy | |
|---|---|---|---|
| | | 2 Days | 4 Days |
| 1 | 50.00 | 0 | 0 |
| 2 | 25.00 | 0 | 0 |
| 3 | 1.00 | 0 | 0 |
| 4 | 0.10 | 50 | 60 |
| 5 | 0.00 | 60 | 90 |

TABLE 4

Seed Germination in Petri dishes

| TRT # | Dose % Mentha spicata | % Germination Ryegrass | |
|---|---|---|---|
| | | 2 Days | 4 Days |
| 1 | 50.00 | 0 | 0 |
| 2 | 25.00 | 0 | 0 |
| 3 | 1.00 | 1 | 0 |
| 4 | 0.10 | 10 | 12 |
| 5 | 0.00 | 70 | 90 |

TABLE 5

Seed Germination in Petri dishes

| TRT # | Dose % Mentha spicata | % Germination Timothy | |
|---|---|---|---|
| | | 2 Days | 4 Days |
| 1 | 50.00 | 0 | 0 |
| 2 | 25.00 | 0 | 0 |
| 3 | 1.00 | 0 | 5 |
| 4 | 0.10 | 20 | 10 |
| 5 | 0.00 | 80 | 80 |

Table 6 summarizes the results when the commercial herbicide Topramezone is used either alone, combined with extracts of *M. spicata*, or the extracts alone in a preemergence treatment. As shown, *M. spicata* was able to control the germination of both ryegrass and Timothy better than Topramezone alone. However, when the extract was added to Topramezone, the herbicidal efficacy of Topramezone greatly increased. Further, this increase was due to the synergy between the extract and Topramezone as shown by the increase in bleaching of the seedlings. As the extract does not cause bleaching, even at a 6× dosage, the increase to 100% bleaching in the combination of the extract and Topramezone is due to the extract acting as a synergist by preventing the sequestering or breakdown of Topramezone and not as an herbicide itself.

TABLE 6

PRE Germination synergy in Petri Dishes

| Topramezone Mentha spicata | PRE Germination % control Rye | % control Timothy | % bleaching of seedlings |
|---|---|---|---|
| Control | 0 | 0 | 0 |
| Topro 1x alone | 50 | 60 | 50 |
| Topro 1x plus Mentha spicata 1x | 80 | 85 | 80 |
| Topro 1x plus Mentha spicata 0.11% v/v | 85 | 90 | 100 |
| Mentha spicata 0.1% v/v | 75 | 75 | 0 |
| Mentha spicata 1% v/v | 95 | 95 | 0 |
| Mentha spicata 6% v/v | 100 | 100 | 0 |

Tables 7-9 also show the synergistic interaction between an *Mentha* extract and commercial herbicides. Table 7 shows that two weeks after a preemergent treatment, when the extract was added to Pendimethalin at a 1x or 2x concentration with the addition of the extract had a similar performance as Pendimethalin at 2x or 4x concentration, respectively, alone in the treatment of ryegrass.

Table 8 also shows the synergy between the extract and a commercial herbicide. The effectiveness of the extract itself drops from 1x or 2x to a 4x concentration. However, when a 4x concentrated extract is added to the commercial herbicide, the effectiveness of the herbicide behaves as if the concentration of the herbicide was doubled in ryegrass.

Table 9, similar to the results seen in Table 8, also shows that even though the effectiveness of the extract's control decreases as the concentration increases in chamomile, when added to a commercial herbicide, the effectiveness of the herbicide greatly increases. In *Amaranthus* and chamomile, this increase raises the effectiveness of a 1x concentration to a 2x concentration when only a 1x concentrated extract is added. Further, unlike the drop in performance seen in chamomile, the effectiveness of the combination increases as the concentration of the extract increases when the concentration of the herbicide is maintained.

TABLE 7

PRE Synergy of Weed control in pots/soil

| Pendimethalin Mentha piperata | PRE Two weeks after planting % control Rye | % control Timothy |
|---|---|---|
| Control | 0 | 0 |
| Pendi 1x | 37 | 50 |
| Pendi 2x | 57 | 75 |
| Pendi 4x | 92 | 83 |
| Pendi 1x Mentha p. 0.1% v/v | 60 | 53 |
| Pendi 1x Mentha p. 1% v/v | 67 | 65 |
| Pendi 1x Mentha p. 4% v/v | 62 | 80 |
| Pendi 2x Mentha p. 4% v/v | 89 | 77 |
| Mentha p. 0.1% v/v | 29 | 47 |
| Mentha p. 1% v/v | 55 | 53 |
| Mentha p. 4% v/v | 38 | 88 |
| Pendi 4x Mentha p. 4% v/v | 90 | 97 |

Pendi is Pendimethalin(Prowl ®)

TABLE 8

PRE Synergy of Weed control in pots/soil

| Oryzalin Mentha piperata | PRE Two weeks after planting % control Rye | % control Timothy |
|---|---|---|
| Control | 0 | 0 |
| Oryzalin 1x | 47 | 90 |
| Oryzalin 2x | 75 | 93 |
| Oryzalin 4x | 93 | 100 |
| Mentha p. 0.1% v/v | 52 | 85 |
| Mentha p. 1% v/v | 52 | 93 |
| Mentha p. 4% v/v | 37 | 82 |
| Oyzalin 1x Mentha p. 0.1% v/v | 48 | 88 |
| Oryzalin 1x Mentha p. 1% v/v | 62 | 92 |
| Oryzalin 1x Mentha p. 4% v/v | 73 | 93 |
| Oryzalin 4x Mentha p. 4% v/v | 93 | 100 |
| Oryzalin 2x Mentha p. 4% v/v | 92 | 100 |

TABLE 9

PRE Synergy of Weed control in pots/soil

| Oryzalin Mentha piperata | Two weeks after planting % control Amaranthus sp. | % control Chamomile sp. |
|---|---|---|
| Control | 0 | 0 |
| Oryzalin 1x | 57 | 33 |
| Oryzalin 2x | 83 | 95 |
| Oryzalin 4x | 90 | 93 |
| Mentha p. 0.1% v/v | 77 | 87 |
| Mentha p. 1% v/v | 77 | 75 |
| Mentha p. 4% v/v | 90 | 77 |
| Oyzalin 1x Mentha p. 0.1% v/v | 88 | 90 |
| Oryzalin 1x Mentha p. 1% v/v | 90 | 95 |
| Oryzalin 1x Mentha p. 4% v/v | 95 | 97 |
| Oryzalin 4x Mentha p. 4% v/v | 98 | 97 |
| Oryzalin 2x Mentha p. 4% v/v | 100 | 98 |

Tables 10-12 also show the synergistic effect between an extract and a commercial herbicide in postemergence treatments. Table 10 shows that the combination of the herbicide and the extract have a supra-additive effect on the control of both ryegrass and Timothy grass. Similarly, Table 11 shows that the addition of the extract speeds up the treatment of the herbicide by nearly a week in both ryegrass and Timothy, having results after 7 days which the herbicide alone normally obtains in 14. Further, the combination has a supra-additive effect on control at 7 days. Similarly, Table 12 shows the same results using a different commercial herbicide.

TABLE 10

POST Synergy Treatments in Pots

| Atrazine | POST emergence to 10 cm plants | |
|---|---|---|
| Mentha piperata | % control Rye | % control Timothy |
| Control | 0 | 0 |
| Atrazine 1x alone | 55 | 60 |
| Atrazine 1x plus Mentha piperata 0.1% v/v | 100 | 100 |
| Atrazine 1x plus Mentha piperata 1% v/v | 100 | 100 |
| Mentha piperata 1% v/v alone | 25 | 25 |

TABLE 11

POST Synergy Treatments in Pots

| | POST emergence to 10 cm plants | | | |
|---|---|---|---|---|
| Glyphosate Mentha piperata | % control Rye 7 days | % control Timothy 7 days | % control Rye 14 Days | % control Timothy 14 Days |
| Control | 0 | 0 | 0 | 0 |
| Glyphosate 1x alone | 0 | 0 | 85 | 90 |
| Glyphosate 1x plus Mentha piperata 0.1% v/v | 85 | 90 | 100 | 100 |
| Glyphosate 1x plus Mentha piperata 2% v/v | 90 | 95 | 100 | 100 |
| Mentha piperata 0.1% v/v alone | 15 | 15 | 25 | 25 |

TABLE 12

POST Synergy Treatments in Pots

| | POST emergence to 10 cm plants | | | |
|---|---|---|---|---|
| Fluazifop (fluazifop-p-butyl) Mentha piperata | % control Rye 7 days | % control Timothy 7 days | % control Rye 14 Days | % control Timothy 14 Days |
| Control | 0 | 0 | 0 | 0 |
| Fluazifop 1x alone | 15 | 25 | 100 | 100 |
| Fluazifop 1x plus Mentha piperata 0.1% v/v | 75 | 85 | 100 | 100 |
| Fluazifop 1x plus Mentha piperata 1% v/v | 95 | 95 | 100 | 100 |
| Mentha piperata 1x % v/v alone | 25 | 30 | 40 | 30 |

Taken together, the results show that when a commercial herbicide is combined with a *Mentha* extract, is performs as if double the amount of herbicide was present in preemergent treatments and acts nearly twice as fast in postemergence treatments.

Without wishing to be bound by a particular theory, it is believed that the unique combination of these extracts delivers a herbicide benefit that is beyond those of the individual components, with faster control, broader weed control, and with less of each extract, needed to achieve effect when combined with a non-*Mentha* herbicide. The herbicide benefit is also enhanced when existing synthetic or organic non-*Mentha* herbicide(s) are combined with the *Mentha* extracts. When combined with the non-*Mentha* herbicides, the amount of *Mentha* extract of the composition can be less than the above amounts and yet obtain at least the same amount of herbicidal effect. Those lowered amounts of extract can be 10-90% less compared to the amount when the *Mentha* extract is used alone. Peppermint depresses the ability of the weed to metabolize the synthetic herbicides, enhancing total control of the weeds while also reducing the time to control. The reduction of plant metabolism to the non-*Mentha* herbicides, and other mint extracts, can break the herbicide resistance to the herbicides.

Example 3: Herbicide Resistant Plant/Weed Control by Treatment of Seeds or Vegetative Tissue Control of herbicide resistant plant by application to seeds or vegetative tissue (leaves) *Mentha* sp. extracts alone or in combination with *Mentha* sp. and/or other essential oils. Testing involves the same methods as listed above but with weeds/plants which are resistant to herbicides. An example plant is corn, which uses a cytochrome P450 enzyme(s) to detoxify certain commercially available herbicides (Ex. mesotrione). Corn also uses a glutathione S-transferase detoxification system for other commercially available herbicides (ex. Atrazine). Still other examples of herbicide detoxification include "Phase I" reactions—dechlorination, hydroxylation, decarboxylation, dealkylation, oxidation/reduction, and hydrolysis are the initial chemical reactions that occur. These reactions detoxify the herbicide and predispose the resultant metabolites to conjugation. "Phase II" reactions are another example, by conjugation with sugars, amino acids or natural plant constituents (metabolites are strongly bound). Also, "Phase II"I reactions are unique to plants and consist of secondary conjugation reactions or the formation of insoluble bound residues. Most crops grown in the world utilize detoxification, mixed function oxidase, enzymes to protect themselves from herbicides and other xenobiotics. Weeds also utilize this system of enzymes, as well as other biochemical actions, to prevent herbicides from damaging or killing the weeds. This is called metabolic herbicide resistance, which renders the weeds/plant which have this capability, tolerance to all commercially available herbicides. There is no commercially available, low toxicity, or deployable solution to weed/plant metabolic resistance to herbicides.

Petri Dish. Seed impacts. Dishes layered with filter paper and filtered water added with various broadleaf and grass species to initiate germination. Conducted in the dark at 75/60° F. day night temperature with relative humidity at 50%. Seeds are allowed to imbibe water for 24 hours. Plates have essential oil extracts added in a water carrying solution using a dose response treatment regime doubling the mg/ml of extract in each successive treatment. Seeds have water added every two days. Seeds are monitored for 14 days following treatment. Plates are exposed to 12/12 hour day/night cycle after 7 days. Visual rating for germination, radicle, shoot, and root elongation are recorded. Commercial herbicides are also used at the US label recommended rate for treatment as a positive control. Not treated plates and seeds have only water used.

Vegetative tissue. Disruption of this process leads to corn not degrading the herbicide and show injury symptoms and tissue destruction. Dishes layered with filter paper and filtered water added with various broadleaf and grass species to initiate germination. Conducted in the dark at 75/60 F day night temperature with relative humidity at 50%. Seeds are allowed to imbibe water for 24 hours. Seedlings are treated at 7 days after initiation of germination. Seedlings have essential oil extracts added in a water with Methylated seed oil (MSO) is used as surfactant for vegetative tissue treatment (0.10% v/v) carrying solution using a dose response treatment regime doubling the mg/ml of extract in each successive treatment. Seeds have water added every two days. Seeds are monitored for 14 days following treatment. Plates are exposed to 12/12 hour day/night cycle after 7-14 days. Visual rating for tissue damage-injury, radicle, shoot, root elongation, color changes to the plant tissues are also recorded. Commercial herbicides are also used at the US label recommended rate for treatment as a positive control. Not treated plates and seeds have only water and MSO.

Micro well plates. These are sterile, filtered water added with various broadleaf and grass species to initiate germination. Conducted in the dark at 75/60 F day night temperature with relative humidity at 50%. Seeds are allowed to imbibe water for 24 hours. Plates have essential oil extracts added in a water carrying solution using a dose response treatment regime doubling as well as a Log dose response using mg/ml of extract in each successive treatment. Seeds, wells have water added every two days. Seeds are monitored for 14 days following treatment. Visual rating for germination, radicle, shoot, and root elongation are recorded. Commercial herbicides are also used at the US label recommended rate for treatment as a positive control. Not treated plates and seeds have only water used.

Potted soil. These assays are conducted in pots using a commercial potting media to establish broadleaf and grass plants with at least one true leaf. The cotyledons are not treated in these assays.

Established Plants

Control of herbicide resistant plants by application to seeds or vegetative tissue (leaves) using *Mentha* sp. extracts alone or in combination with *Mentha* sp. and/or synthetic or organic herbicidal compound(s).

Petri Dish. Methods listed above.
Micro well plates. Methods listed above.
Potted soil. Methods listed above.
Established plants. Methods listed above.

Results

Table 13 shows a synergistic effect in controlling resistant plants. As shown, neither the commercial herbicide nor the extract at low concentrations was able to control the resistant corn. However, when mixed, the low concentration extract was able remove the resistance in the corn as shown by comparing the results to the non-resistant Timothy grass.

TABLE 13

| Disrupting Metabolism of Herbicide Resistant Plants in Pots Topramezone | POST to 2-leaf corn | |
|---|---|---|
| (Topro) Mentha piperata | % Control 14 Day | % Green loss Timothy 14 Day |
| Control | 0 | 0 |
| Topro 1x | 0 | 5 |
| Mentha p. 0.1% v/v | 0 | 5 |
| Mentha p. 1% v/v | 0 | 5 |
| Mentha p. 10% v/v | 5 | 5 |
| Topro + Mentha p. 0.1% v/v | 5 | 10 |
| Topro + Mentha p. 1% v/v | 5 | 15 |

TABLE 13-continued

| Disrupting Metabolism of Herbicide Resistant Plants in Pots Topramezone | POST to 2-leaf corn | |
|---|---|---|
| (Topro) Mentha piperata | % Control 14 Day | % Green loss Timothy 14 Day |
| Topro + Menthap. 10% v/v | 5 | 15 |
| Mentha Spicata 1% v/v Mentha p. 1% v/v | 25 | 35 |

Example 4: Disruption of Plant Xenobiotic Detoxification Metabolism Mechanisms

Plant metabolism disruption using *Mentha* sp. and other essential oils alone or in combination with *Mentha* sp. and/or other essential oils. Description of methods and plant materials listed above.

Plant leaves. Methods listed above. Monitoring of changes in the chlorophyll and carotenoid levels, which are reduced when the metabolism is slowed or stopped using the extracts alone or in combination.

Plant seeds/germination. Methods listed above. Monitoring of changes in the chlorophyll and carotenoid levels, which are reduced when the metabolism is slowed or stopped using the extracts alone or in combination. Disruption in germination, leading to no or smaller roots and shoots.

Established plants. Methods listed above. Monitoring of changes in the chlorophyll and carotenoid levels, which are reduced when the metabolism is slowed or stopped using the extracts alone or in combination. Plant size, mass, visual injury, and photosynthesis are monitored for changes versus the control untreated and with the treatments of the herbicides alone.

Example 5: Plant Control from Treatment with Essential Oils Alone and in Unique Combinations In order to test the control of plants, *Mentha* sp. extracts alone or in combination with *Mentha* sp. and/or other essential oils were applied to vegetative tissue (leaves) in a field trial. Trial conducted as follows. Broadleaf and grass plants treated using a CO2 pressurized sprayer with even fan nozzles spraying 20 gallons per acre of mixture. Field site contained native and seeded plants.

As shown in Tables 14-16, the combinations of the essential oils are more effective at control and necrosis than the oils by themselves. Enhanced control and necrosis at much lower levels (% v/v) than with the oils by themselves. Activity is enhanced when combining any of the oils containing (Menthol/Menthone) with *M. spicata* (Carvone).

TABLE 14

| Control with M. piperata solo and in combination with essential oils. 14 days after treatment. | | |
|---|---|---|
| | % control Broadleaf | % control Grass |
| Not Treated Check | 0 | 0 |
| Solo Pip 25% | 16.25 | 18.75 |
| Solo Pip 20% | 22.5 | 18.75 |
| Solo Pip 15% | 22.5 | 20 |
| Solo Pip 10% | 13.75 | 10 |
| Solo Pip 5% | 5 | 0 |
| Pip 20% Spica 20% | 75 | 70 |

TABLE 14-continued

Control with M. piperata solo and in combination with essential oils.
14 days after treatment.

| | % control Broadleaf | % control Grass |
|---|---|---|
| Pip 20% Spica 15% | 72.5 | 67.5 |
| Pip 20% Spica 10% | 70 | 52.5 |
| Pip 20% Spica 5% | 65 | 57.5 |
| Pip 15% Spica 20% | 61.25 | 60 |
| Pip 15% Spica 15% | 58.75 | 50 |
| Pip 15% Spica 10% | 56.25 | 40 |
| Pip 15% Spica 5% | 21.25 | 7.5 |
| Pip 10% Spica 20% | 81.25 | 41.25 |
| Pip 10% Spica 15% | 72.5 | 42.5 |
| Pip 10% Spica 10% | 51.25 | 37.5 |
| Pip 10% Spica 5% | 77.5 | 51.25 |
| Pip 5% Spica 20% | 72.5 | 52.5 |
| Pip 5% Spica 15% | 47.5 | 47.5 |
| Pip 5% Spica 10% | 33.75 | 27.5 |
| Pip 5% Spica 5% | 37.5 | 13.75 |
| Pip 20% Arv 20% | 65 | 58.75 |
| Pip 20% Arv 15% | 68.75 | 60 |
| Pip 20% Arv 10% | 67.5 | 60 |
| Pip 20% Arv 5% | 68.75 | 58.75 |
| Pip 15% Arv 20% | 70 | 32.5 |
| Pip 15% Arv 15% | 55 | 35 |
| Pip 15% Arv 10% | 47.5 | 28.75 |
| Pip 15% Arv 5% | 48.75 | 27.5 |
| Pip 10% Arv 20% | 68.75 | 55 |
| Pip 10% Arv 15% | 63.75 | 43.75 |
| Pip 10% Arv 10% | 46.25 | 36.25 |
| Pip 10% Arv 5% | 43.75 | 33.75 |
| Pip 5% Arv 20% | 62.5 | 57.5 |
| Pip 5% Arv 15% | 47.5 | 31.25 |
| Pip 5% Arv 10% | 52.5 | 32.5 |
| Pip 5% Arv 5% | 31.25 | 20 |

TABLE 15

Control with M. spicata solo and in combination with essential oils.
14 days after treatment.

| | % control Broadleaf | % control Grass |
|---|---|---|
| Not Treated Check | 0 | 0 |
| Solo Spicata 25% | 63.75 | 52.5 |
| Solo Spicata 20% | 45.75 | 38.75 |
| Solo Spicata 15% | 41.25 | 16.25 |
| Solo Spicata 10% | 18.75 | 3.75 |
| Solo Spicata 5% | 3.75 | 0 |
| Pip 20% Spica 20% | 75 | 70 |
| Pip 20% Spica 15% | 72.5 | 67.5 |
| Pip 20% Spica 10% | 70 | 52.5 |
| Pip 20% Spica 5% | 65 | 57.5 |
| Pip 15% Spica 20% | 61.25 | 60 |
| Pip 15% Spica 15% | 58.75 | 50 |
| Pip 15% Spica 10% | 56.25 | 40 |
| Pip 15% Spica 5% | 21.25 | 7.5 |
| Pip 10% Spica 20% | 81.25 | 41.25 |
| Pip 10% Spica 15% | 72.5 | 42.5 |
| Pip 10% Spica 10% | 51.25 | 37.5 |
| Pip 10% Spica 5% | 77.5 | 51.25 |
| Pip 5% Spica 20% | 72.5 | 52.5 |
| Pip 5% Spica 15% | 47.5 | 47.5 |
| Pip 5% Spica 10% | 33.75 | 27.5 |
| Pip 5% Spica 5% | 37.5 | 13.75 |
| Arv 20% Spica 20% | 78.75 | 75 |
| Arv 20% Spica 15% | 73.75 | 72.5 |
| Arv 20% Spica 10% | 66.25 | 53.75 |
| Arv 20% Spica 5% | 60 | 48.75 |
| Arv 15% Spica 20% | 73.75 | 61.25 |
| Arv 15% Spica 15% | 70 | 68.75 |
| Arv 15% Spica 10% | 67.5 | 48.75 |
| Arv 15% Spica 5% | 53.75 | 41.25 |
| Arv 10% Spica 20% | 71.25 | 71.25 |

TABLE 15-continued

Control with M. spicata solo and in combination with essential oils.
14 days after treatment.

| | % control Broadleaf | % control Grass |
|---|---|---|
| Arv 10% Spica 15% | 70 | 66.25 |
| Arv 10% Spica 10% | 70 | 57.5 |
| Arv 10% Spica 5% | 48.75 | 32.5 |
| Arv 5% Spica 20% | 63.75 | 43.75 |
| Arv 5% Spica 15% | 56.25 | 50 |
| Arv 5% Spica 10% | 47.5 | 33.75 |
| Arv 5% Spica 5% | 21.25 | 13.75 |

TABLE 16

Control with M. arvensis solo and in combination with essential oils.
14 days after treatment.

| | % control Broadleaf | % control Grass |
|---|---|---|
| Not Treated Check | 0 | 0 |
| Solo Arv 25% | 76.25 | 61.25 |
| Solo Arv 20% | 48.75 | 26.25 |
| Solo Arv 15% | 41.25 | 22.5 |
| Solo Arv 10% | 31.25 | 13.75 |
| Solo Arv 5% | 18.75 | 5 |
| Arv 20% Spica 20% | 78.75 | 75 |
| Arv 20% Spica 15% | 73.75 | 72.5 |
| Arv 20% Spica 10% | 66.25 | 53.75 |
| Arv 20% Spica 5% | 60 | 48.75 |
| Arv 15% Spica 20% | 73.75 | 61.25 |
| Arv 15% Spica 15% | 70 | 68.75 |
| Arv 15% Spica 10% | 67.5 | 48.75 |
| Arv 15% Spica 5% | 53.75 | 41.25 |
| Arv 10% Spica 20% | 71.25 | 71.25 |
| Arv 10% Spica 15% | 70 | 66.25 |
| Arv 10% Spica 10% | 70 | 57.5 |
| Arv 10% Spica 5% | 48.75 | 32.5 |
| Arv 5% Spica 20% | 63.75 | 43.75 |
| Arv 5% Spica 15% | 56.25 | 50 |
| Arv 5% Spica 10% | 47.5 | 33.75 |
| Arv 5% Spica 5% | 21.25 | 13.75 |
| Pip 20% Arv 20% | 65 | 58.75 |
| Pip 20% Arv 15% | 68.75 | 60 |
| Pip 20% Arv 10% | 67.5 | 60 |
| Pip 20% Arv 5% | 68.75 | 58.75 |
| Pip 15% Arv 20% | 70 | 32.5 |
| Pip 15% Arv 15% | 55 | 35 |
| Pip 15% Arv 10% | 47.5 | 28.75 |
| Pip 15% Arv 5% | 48.75 | 27.5 |
| Pip 10% Arv 20% | 68.75 | 55 |
| Pip 10% Arv 15% | 63.75 | 43.75 |
| Pip 10% Arv 10% | 46.25 | 36.25 |
| Pip 10% Arv 5% | 43.75 | 33.75 |
| Pip 5% Arv 20% | 62.5 | 57.5 |
| Pip 5% Arv 15% | 47.5 | 31.25 |
| Pip 5% Arv 10% | 62.5 | 32.5 |
| Pip 5% Arv 5% | 31.25 | 20 |

Example 6: Soybean Desiccation, Control, and Leaf Necrosis from Treatment with Essential Oils Alone and in Unique Combinations with Synthetic Herbicides In order to test the control of plants, *Mentha* sp. extracts alone or in combination with *Mentha* sp. and/or one or more synthetic herbicides (Carfentrazone and/or Glufosinate) were applied to vegetative tissue (leaves) of soybean (glyphosate tolerant) in a field trial.

FIG. 1 shows the results of treatment with essential oils alone and in unique combinations with synthetic herbicide Carfentrazone (PPO-inhibitor). Trial conducted as follows.

Soybean plants at R-2 growth stage were treated using a CO2 pressurized sprayer with even fan nozzles spraying 20 gallons per acre of mixture.

The results show that the 1:1 ratio of *M. piperata* and *M. spicata* are an effective desiccation/necrosis treatment, comparable to the synthetic herbicide-defoliation carfentrazone. Combining carfentrazone with low rates of *M. piperata/M. spicata* (also at low rates) showed highly enhanced desiccation and necrosis. Essential oils do not antagonize synthetic herbicide use. Use of the essential oils with synthetic herbicide enhance the synthetic herbicide activity.

Figure 2:
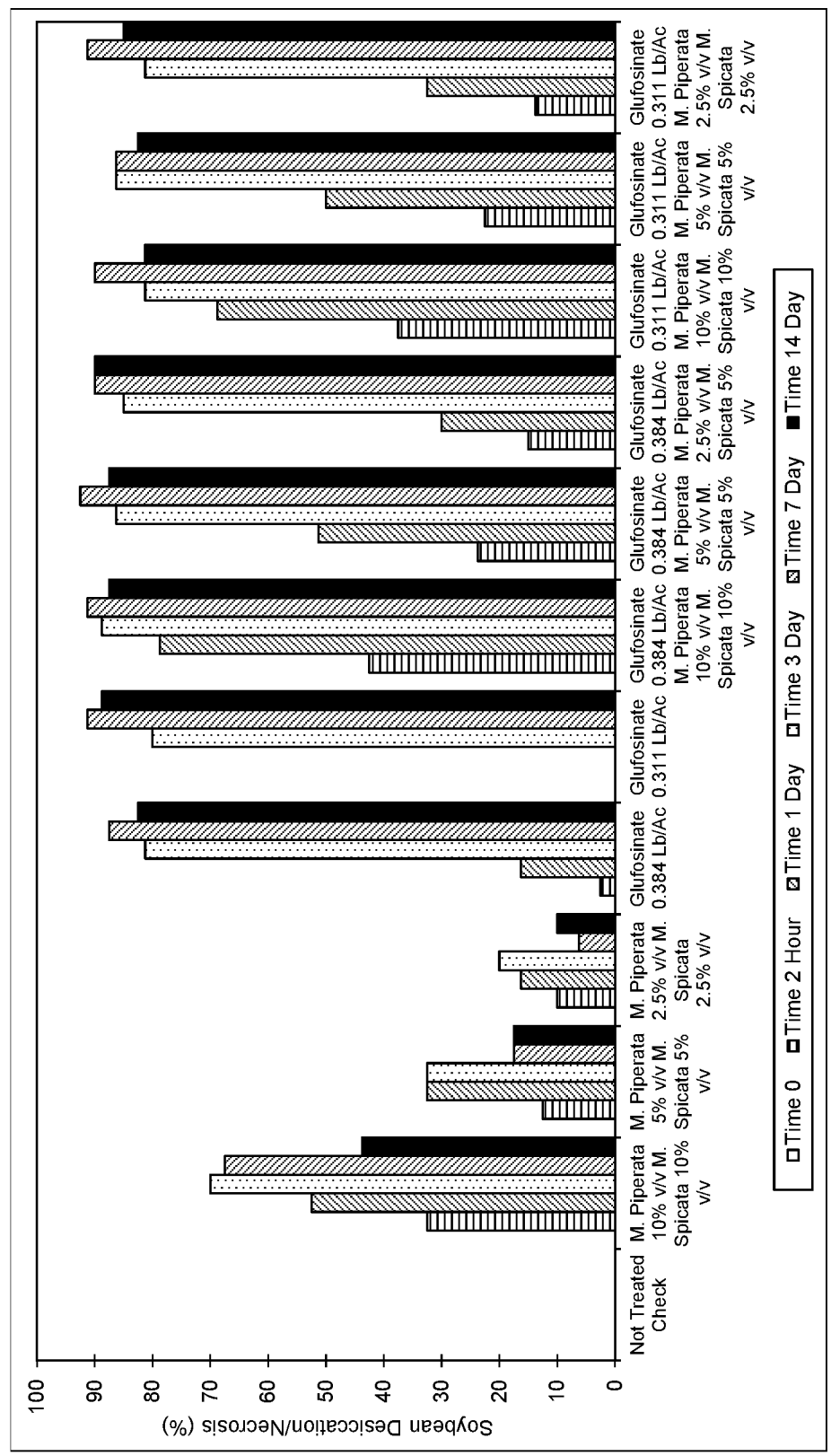
FIG. 2 shows soybean (glyphosate tolerant) desiccation, control, and leaf necrosis from treatment with essential oils alone and in unique combinations with synthetic herbicide Glufosinate-ammonium (glutamine synthetase inhibitor). 0 to 14 days after treatment.

FIG. 2 shows the results of treatment with essential oils alone and in unique combinations with synthetic herbicide Glufosinate-ammonium (glutamine synthetase inhibitor). Trial conducted as follows. Soybean (Glyphosate tolerant) plants at R-2 growth stage were treated using a CO2 pressurized sprayer with even fan nozzles spraying 20 gallons per acre of mixture.

The results show that the 1:1 ratio of *M. piperata* and *M. spicata* are effective desiccation and necrosis treatment, comparable to the synthetic herbicide-defoliation Glufosinate. Combining Glufosinate with low rates of *M. piperata/M. spicata* (also at lower rates) show highly enhanced desiccation and necrosis. Essential oils do not antagonize synthetic herbicide use. Use of the essential oils with synthetic herbicide enhance the synthetic herbicide activity.

Figure 3:
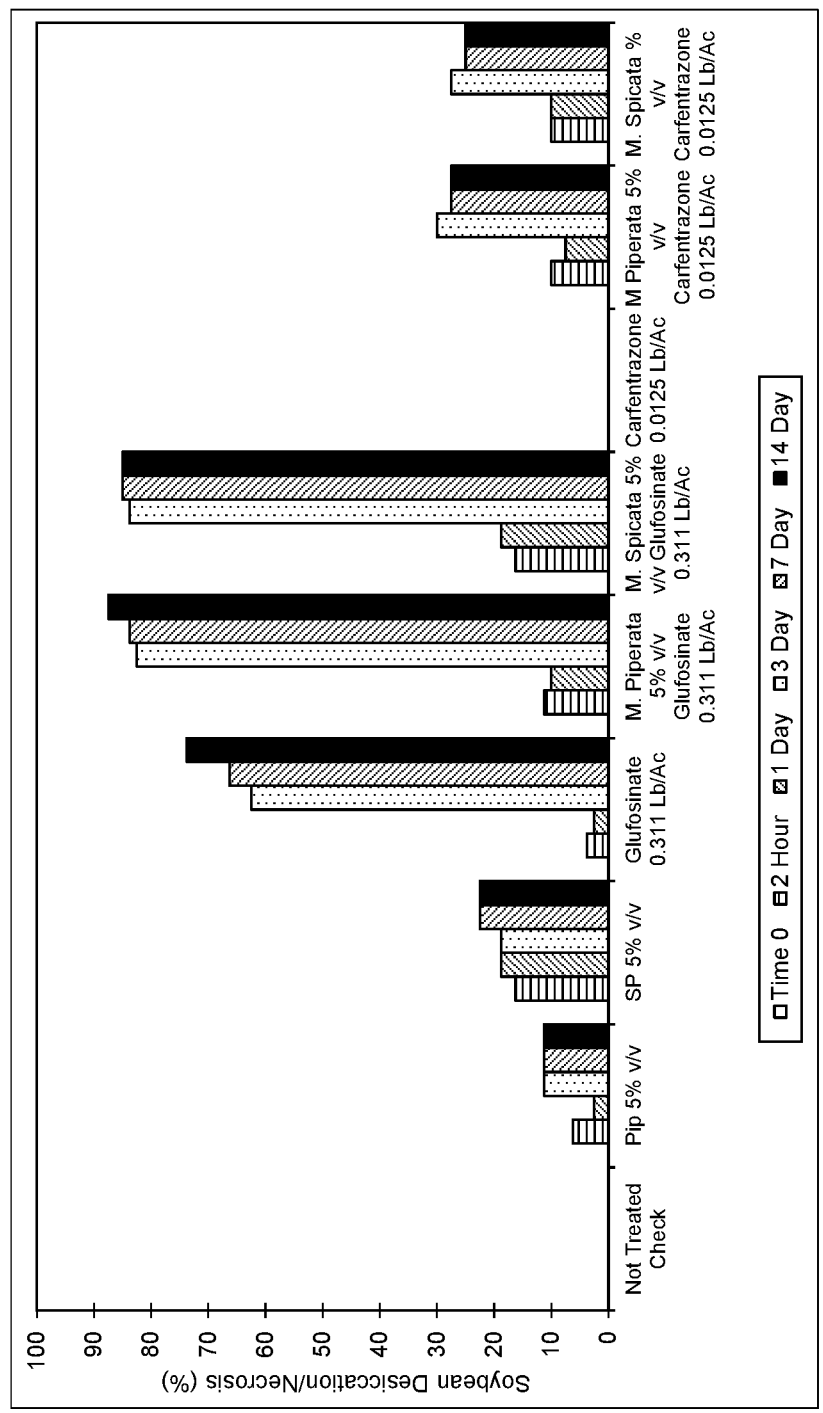
FIG. 3 shows soybean (glyphosate tolerant) desiccation, control, and leaf necrosis from treatment with essential oils alone and in unique combinations with synthetic herbicide Glufosinate-ammonium (glutamine synthetase inhibitor) or synthetic herbicide Carfentrazone (PPO-inhibitor). 0 to 14 days after treatment.
Figure 4A:
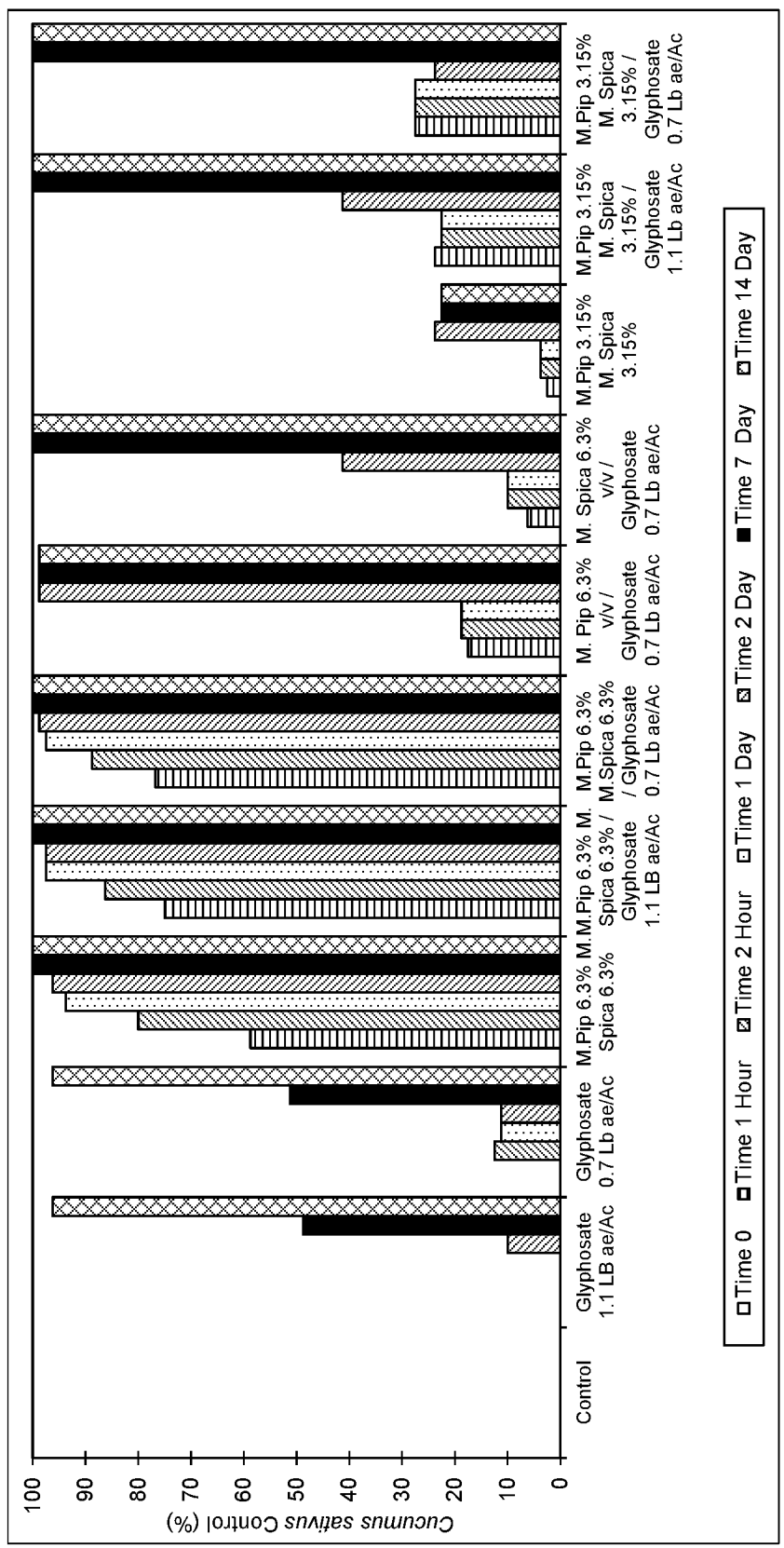
FIG. 4A-D show plant control and leaf necrosis from treatment with essential oils alone and in unique combinations with synthetic herbicide Glyphosate (EPSP synthase inhibitor). 0 to 14 days after treatment.
Figure 4B:
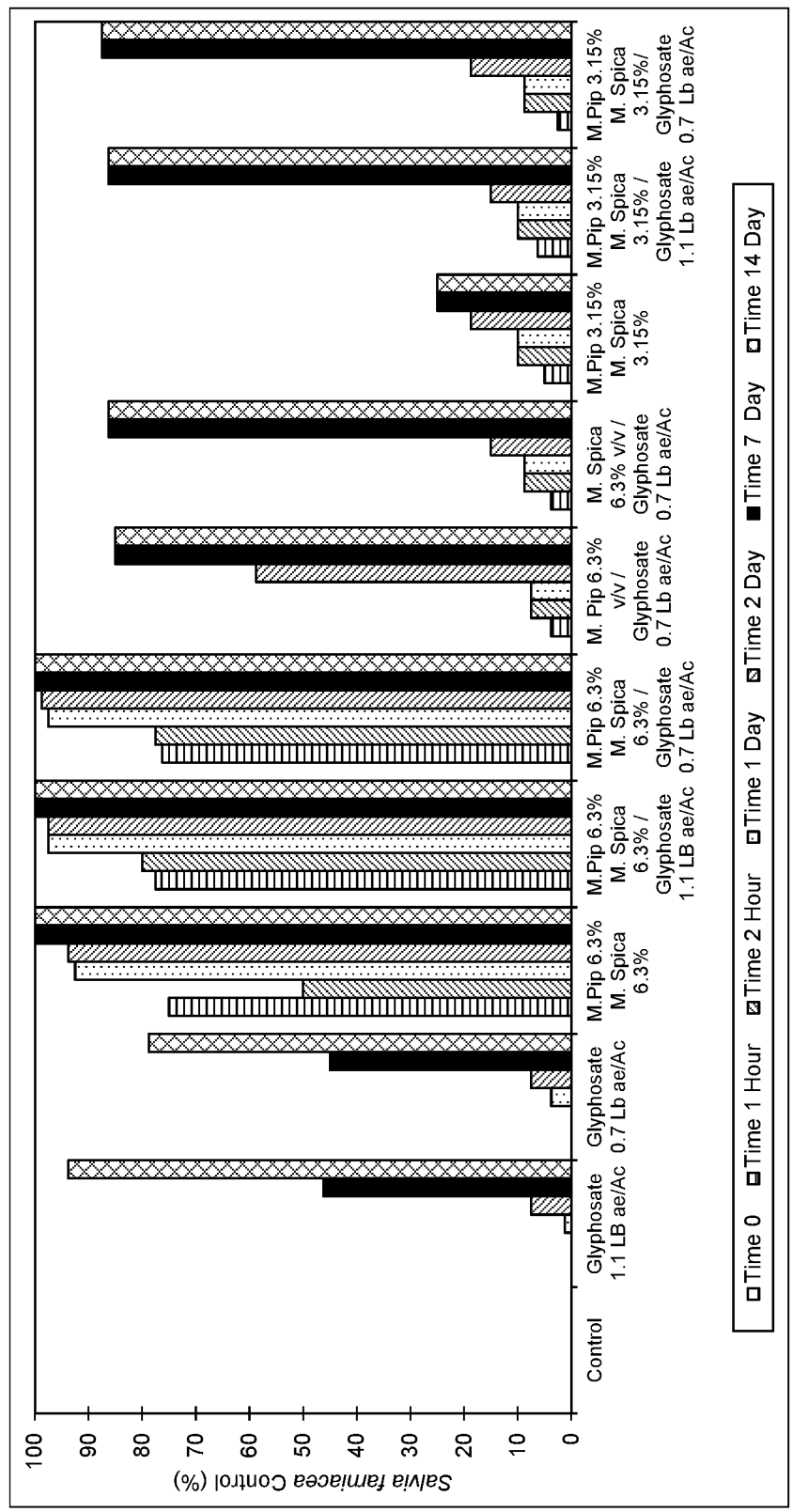
Figure 4C:
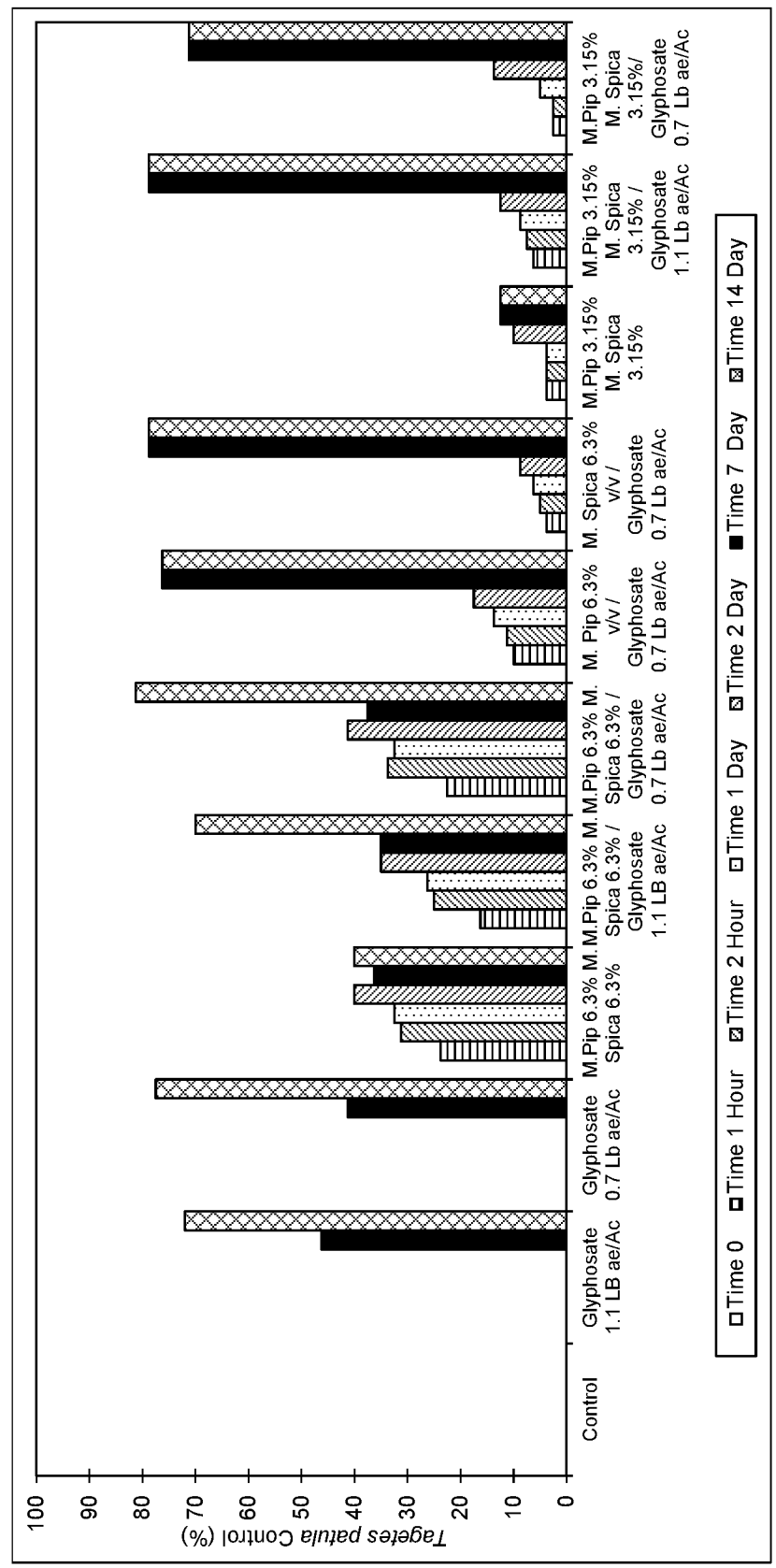
Figure 4D:
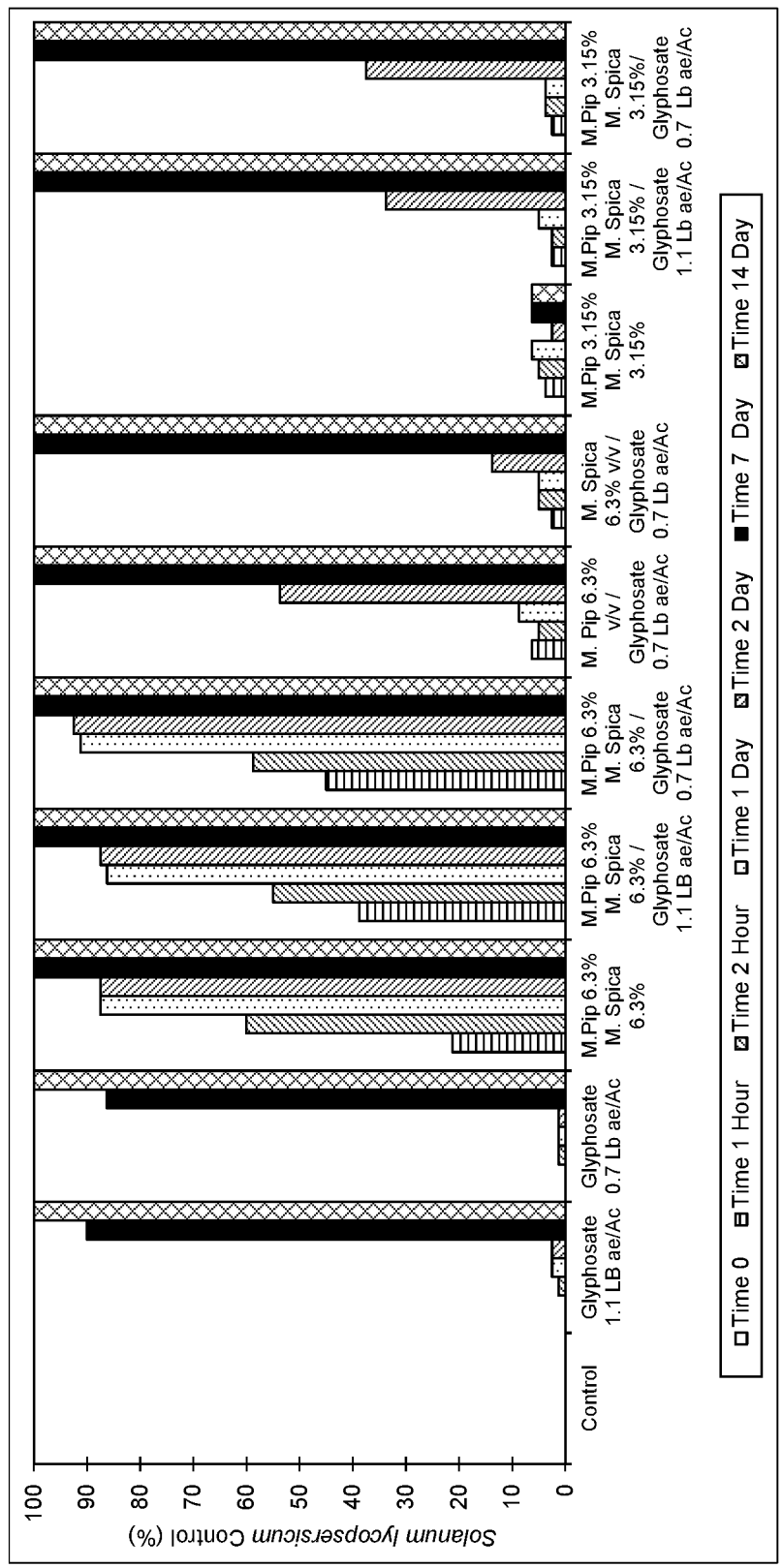
Figure 5A:
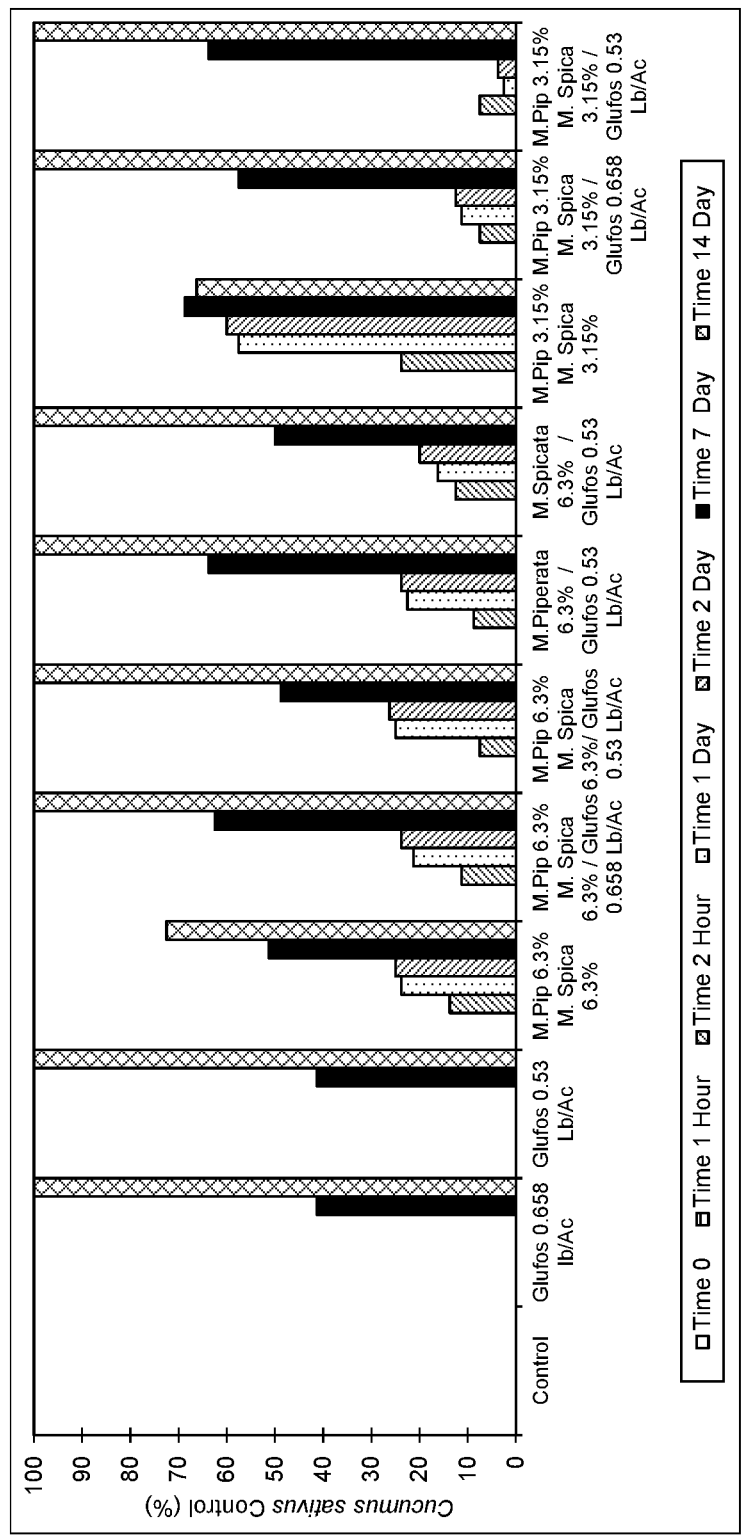
FIG. 5A-D show plant control and leaf necrosis from treatment with essential oils alone and in unique combinations with synthetic herbicide Glufosinate (Glutamine synthetase inhibitor). 0 to 14 days after treatment.
Figure 5B:
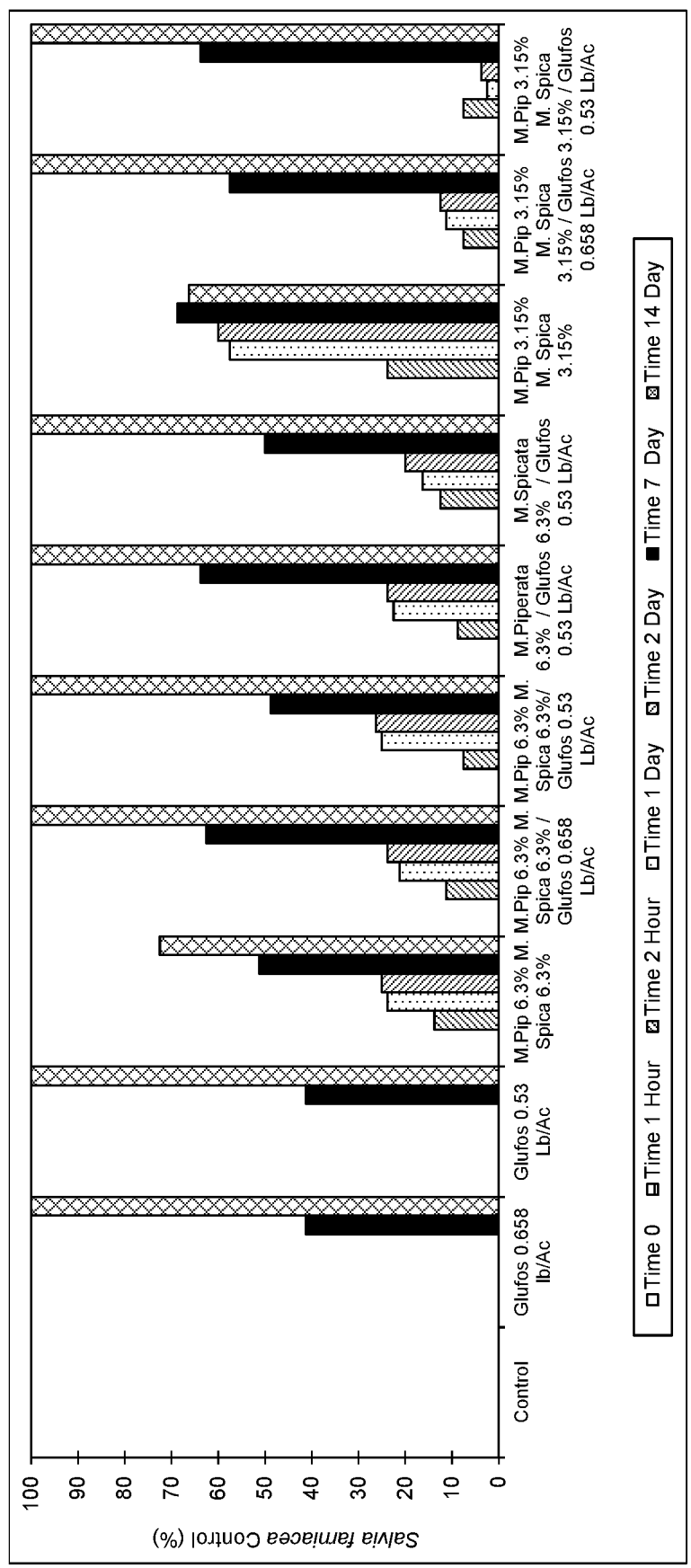
Figure 5C:
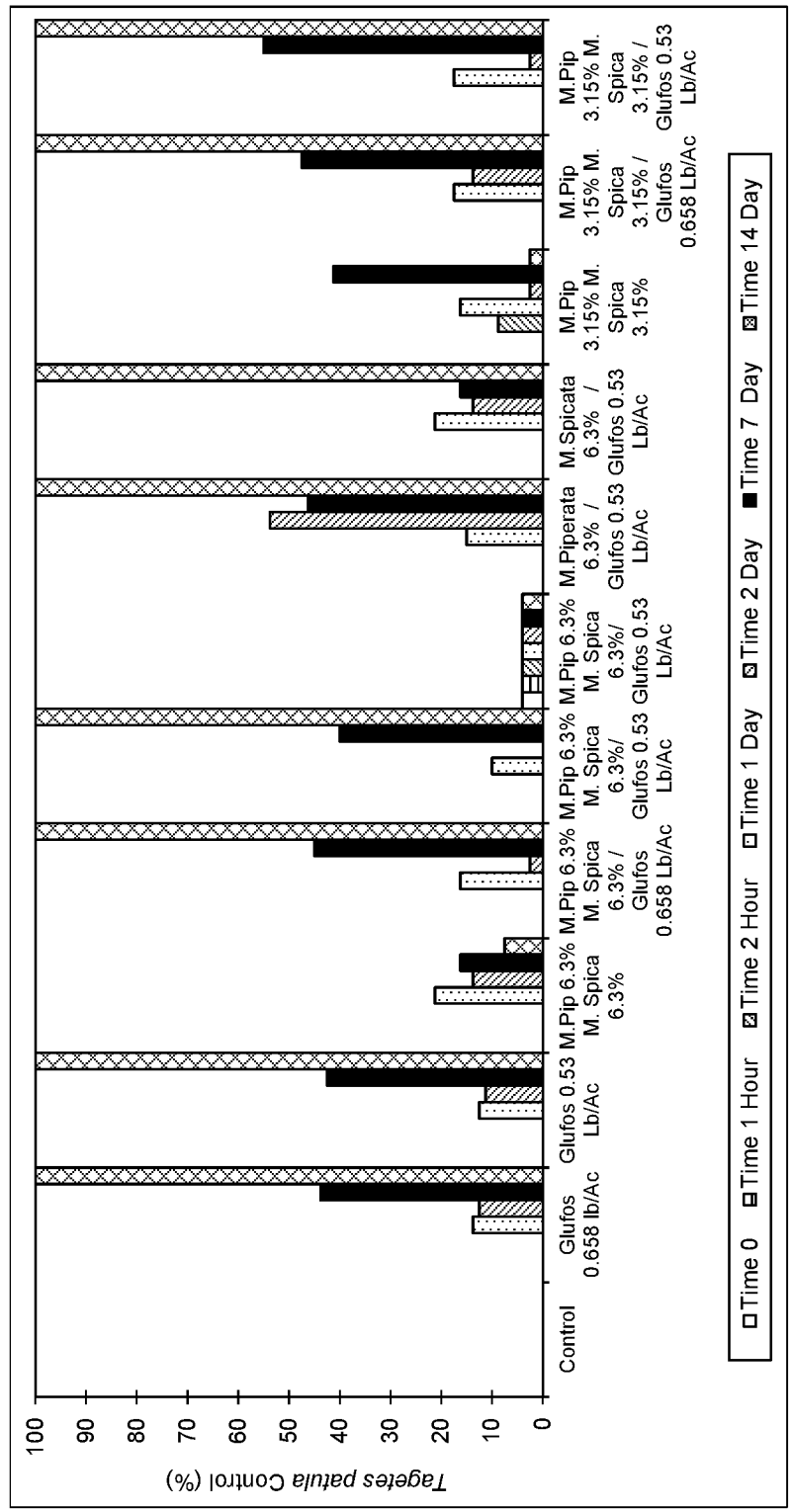
Figure 5D:
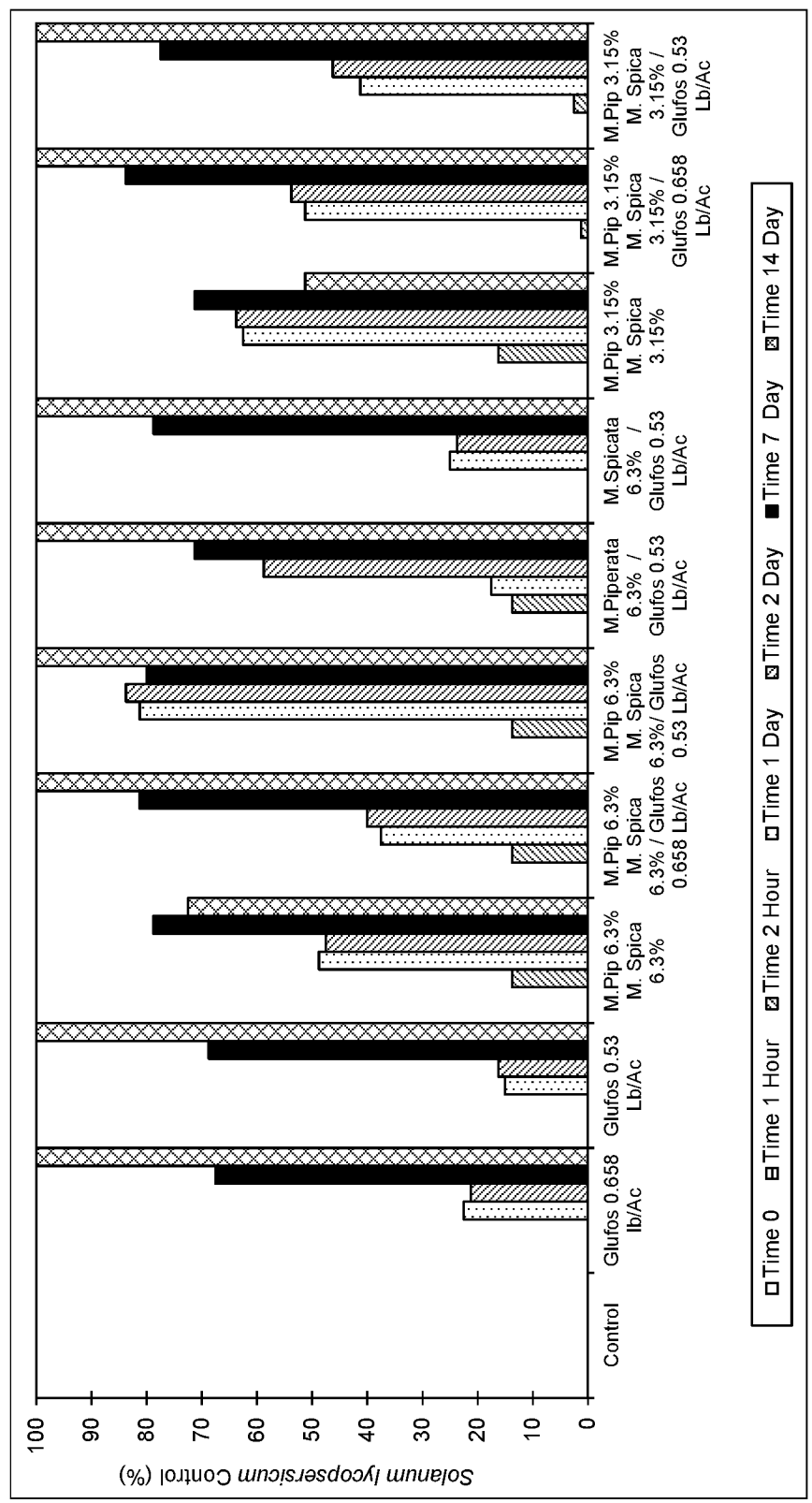

FIG. 3 shows the results of treatment with essential oils alone and in unique combinations with synthetic herbicide Glufosinate-ammonium or synthetic herbicide Carfentrazone. Trial conducted as follows. Soybean (Glyphosate tolerant) plants at R-4 growth stage were treated using a CO2 pressurized sprayer with even fan nozzles spraying 20 gallons per acre of mixture.

The individual essential oils used at these rates and without additives from either *M. piperata* and *M. spicata* are mildly effective desiccation and necrosis treatment, comparable to the synthetic herbicide-defoliation Glufosinate or Carfentrazone. Combining Glufosinate or Carfentrazone with low rates of *M. piperata* or *M. spicata* (also at low rates) show highly enhanced desiccation and necrosis. Essential oils do not antagonize synthetic herbicide use. Use of the essential oils with synthetic herbicide enhance the synthetic herbicide activity. Chemical content of the essential oils each enhance activity of the herbicides used in this trial.

Example 7: Plant Control and Leaf Necrosis from Treatment with Essential Oils Alone and in Unique Combinations with Synthetic Herbicides In order to test the control of plants, *Mentha* sp. extracts alone or in combination with *Mentha* sp. and/or one or more synthetic herbicides (Glyphosate and/or Glufosinate) were applied to vegetative tissue (leaves) of *Salvia farniacea*, *Tagetes patula*, *Cucumis sativus*, and *Solanum lycopsersicum* plants in a greenhouse setting using the same potted plant protocols listed above. Plants 4-6 inches in height, with established root systems (2-3 months old) were treated using a pressurized sprayer with misting nozzle spraying 20 gallons per acre of mixture.

FIGS. 4A-D show the results of treatment with essential oils alone and in unique combinations with synthetic herbicide Glyphosate (EPSP synthase inhibitor). FIGS. 5A-D show the results of treatment with essential oils alone and in unique combinations with synthetic herbicide Glufosinate (Glutamine synthase inhibitor). The individual essential oils from either *M. piperata* or *M. spicata* are effective for control and necrosis treatment. Combinations of the oils are more effective for control and necrosis. The essential oil combinations with Glyphosate increase the speed of control of Glyphosate and total control in certain plants. Combinations or individual essential oils do not antagonize synthetic herbicide use. Use of the essential oils with synthetic herbicide enhance the synthetic herbicide activity.

Example 8: Impact of Essential Oils on the Detoxification System of Treated Plants The individual essential oils from each of the plants tested (*M. piperata*, *M. spicata*, *M. arvensis*, Caraway (*Carum carvi*), and Dill (*Anethum graveolens*) demonstrate inhibition of the detoxification mechanisms of corn and/or dry bean (*Phaseolus* sp.) in a greenhouse setting using the same potted plant protocols listed above. Plants were 4-6 inches in height with at least one true leaf or trifoliate. Plants were treated using a pressurized sprayer with misting nozzle spraying 20 gallons per acre of mixture.

Tables 17-20 show the impact of essential oils on the detoxification system of treated plants. Use of different doses of essential oils demonstrate the disruption of the xenobiotic metabolism systems with mixed function oxidases, sequestration, glutathione S-transferase, and similar enzymatic systems which render the treated plants tolerant to certain synthetic herbicides.

Corn and dry bean use established enzymatic mechanism to remove xenobiotics, in particular certain herbicides. Detoxification must happen immediately following the treatment with the herbicide for the treated plant to avoid cellular damage and toxicity. The essential oil extracts are disrupting the ability of these enzymes to remove the herbicide from the plant cells. This follows with the herbicide binding to the active enzymatic sites in the treated plants. Subsequent disruption of the physiological pathways of the treated plant will result in maximum damage-phytotoxicity from 10-14 days after treatment. The use of a lower dose of essential oil to initiate these biochemical disruptions is evident in the data. It is also evident that higher doses of the essential oils (either alone or in combinations) will disrupt the enzyme actions in the treated plants but can be difficult to see because of the ability of the extracts to cause cellular damage via their own plant cellular membrane disruption activity.

This benefit is unique and a separate response to the benefits seen with non-selective herbicides (glyphosate, glufosinate, etc.) by which the essential oils enhance herbicide binding speed of control.

TABLE 17

Control of *Zea mays* with Mesotrione and combinations of essential oils.

| | 15% v/v | 10% v/v | 5% v/v | 2/5% v/v | Mesotrione + 15% v/v | Mesotrione + 10% v/v | Mesotrione + 5% v/v | Mesotrione + 2/5% v/v | Mesotrione | Pip 7.5% + Spica 7.5% | Mesotrione + Pip 7.5% + Spica 7.5% |
|---|---|---|---|---|---|---|---|---|---|---|---|
| M. Piperata | 73 | 57.5 | 26.7 | 17.5 | 94.2 | 93.3 | 96.3 | 100 | 1 | 98 | 56 |
| M. Spicata | 97.5 | 84.2 | 89 | 19.2 | 98.3 | 100 | 97.5 | 100 | 4.1 | 100 | 100 |
| M. Arvensis | 92 | 87.5 | 66 | 41 | 100 | 97.5 | 87 | 96 | 2 | 100 | 100 |
| Dill | 78 | 68 | 71 | 51 | 100 | 98 | 84 | 76 | 0 | 97 | 100 |
| Caraway | 97 | 76 | 44 | 54 | 99 | 100 | 99 | 99 | 0 | 87 | 100 |

TABLE 18

Control of *Zea mays* with Halosulfuron and combinations of essential oils.

| | 15% v/v | 10% v/v | 5% v/v | 2/5% v/v | Halosulfuron + 15% v/v | Halosulfuron + 10% v/v | Halosulfuron + 5% v/v | Halosulfuron + 2/5% v/v | Halosulfuron | Pip 7.5% + Spica 7.5% | Halosulfuron + Pip 7.5% + Spica 7.5% |
|---|---|---|---|---|---|---|---|---|---|---|---|
| M. Piperata | 56 | 27.5 | 9 | 0 | 63 | 22.5 | 80 | 44 | 19 | 84 | 80 |
| M. Spicata | 47.5 | 62.5 | 64 | 56 | 45 | 80 | 62.5 | 65 | 1 | 63 | 85 |
| M. Arvensis | 72.5 | 61.6 | 65.8 | 43 | 74.2 | 75.5 | 63.3 | 81 | 2.5 | 79.2 | 80 |
| Dill | 70 | 69 | 58 | 24 | 65 | 85 | 64 | 44 | 12 | 89 | 92 |
| Caraway | 70 | 69 | 58 | 24 | 65 | 85 | 64 | 44 | 20 | 60 | 72 |

TABLE 19

Control of *Phaseolus vulgaris* with Bentazon and combinations of essential oils.

| | 15% v/v | 10% v/v | 5% v/v | 2/5% v/v | Bentazon + 15% v/v | Bentazon + 10% v/v | Bentazon + 5% v/v | Bentazon + 2/5% v/v | Bentazon | Pip 7.5% + Spica 7.5% | Bentazon + Pip 7.5% + Spica 7.5% |
|---|---|---|---|---|---|---|---|---|---|---|---|
| M. Piperata | 26.7 | 17.5 | 6 | 1 | 36.25 | 35 | 37 | 16 | 20 | 94 | 89 |
| M. Spicata | 37 | 18.75 | 11.25 | 1 | 47 | 36 | 26 | 17 | 20 | 95 | 100 |
| M. Arvensis | 14 | 8 | 3 | 1.25 | 75 | 76.25 | 57.5 | 52.5 | 26 | 94 | 100 |
| Dill | 18.3 | 18.8 | 5 | 3 | 66.75 | 60 | 57 | 26.7 | 29 | 64 | 75 |
| Caraway | 23.3 | 13 | 3.75 | 1.25 | 56.8 | 46.75 | 48.75 | 55 | 20 | 86 | 94 |

TABLE 20

Control of *Phaseolus vulgaris* with Imazamox and combinations of essential oils.

| | 15% v/v | 10% v/v | 5% v/v | 2/5% v/v | Imazamox + 15% v/v | Imazamox + 10% v/v | Imazamox + 5% v/v | Imazamox + 2/5% v/v | Imazamox | Pip 7.5% + Spica 7.5% | Imazamox + Pip 7.5% + Spica 7.5% |
|---|---|---|---|---|---|---|---|---|---|---|---|
| M. Piperata | 77 | 69 | 15 | 14.2 | 90 | 80 | 42.5 | 40 | 5 | 94 | 97.5 |
| M. Spicata | 99 | 97.5 | 73.3 | 15.8 | 97 | 97 | 60.8 | 65 | 3 | 97.5 | 98 |

TABLE 20-continued

Control of Phaseolus vulgaris with Imazamox and combinations of essential oils.

| | 15% v/v | 10% v/v | 5% v/v | 2/5% v/v | Imazamox + 15% v/v | Imazamox + 10% v/v | Imazamox + 5% v/v | Imazamox + 2/5% v/v | Imazamox | Pip 7.5% + Spica 7.5% | Imazamox + Pip 7.5% + Spica 7.5% |
|---|---|---|---|---|---|---|---|---|---|---|---|
| M. Arvensis | 87 | 72.5 | 69 | 67 | 76.5 | 61 | 63 | 72 | 6 | 95 | 99 |
| Dill | 95 | 87.5 | 72 | 57 | 95 | 88 | 75 | 52.5 | 3 | 88.75 | 92 |
| Caraway | 92.5 | 88 | 77.5 | 67 | 100 | 90 | 72.5 | 72 | 5 | 96 | 97.5 |

What is claimed is:

1. A herbicidal composition, comprising:
   a *Mentha* sp. extract mixture, wherein said mixture comprises two or more of:
   an extract from *M. spicata*, an extract from *M. arvensis*, an extract from *M. piperata*, and a synthetic or organic herbicide; and
   a surfactant, excipient, carrier or diluent or combination thereof,
   wherein the synthetic or organic herbicide comprises topramezone, pendimethalin, oryzalin, atrazine, glyphosate, fluazifop, carfentrazone, glufosinate, mesotrione, halosulfuron, bentazon, or imazamox, or a combination thereof; and
   wherein the said mixture comprising the two or more of: an extract from *M. spicata*, an extract from *M. arvensis*, an extract from *M. piperata*, and a synthetic or organic herbicide exhibits a better herbicidal activity than either alone.

2. The herbicidal composition of claim 1, wherein composition further comprises a plant extract comprising carvone(R,S), menthol, menthone, 1,8-cineole, limonene(R,S) containing oils or a combination thereof.

3. The herbicidal composition of claim 1, further comprising an extract from *Carum carvi, Syzygium aromaticum, Anehum graveolens*, and/or combinations thereof.

4. The herbicidal composition of claim 1, wherein said composition comprises an extract from *M. spicata* and *M. piperata*.

5. The herbicidal composition of claim 1, wherein the concentration for preemergent treatment is from about 1.0-kilogram active ingredient per hectare (kg ai/ha) to about 45.0 kg ai/ha.

6. The herbicidal composition of claim 1, wherein the concentration for post emergent treatment is from about 1.0 kg ai/ha to about 40.0 kg ai/ha.

7. The herbicidal composition of claim 1, wherein said composition comprises one or more said synthetic or organic herbicide.

8. The herbicidal composition of claim 7, wherein the synthetic or organic herbicide is added from about 1.5 kg ai/ha to about 25.0 kg ai/ha.

9. The herbicidal composition of claim 1, further comprising an additional functional ingredient.

10. The herbicidal composition of claim 9, wherein the additional function ingredient is a solubilizer, an adjuvant, a stabilizer, an emulsifier, a desiccant, a defoliant, a pH agent, and/or combinations thereof in sufficient amounts to be effective.

11. The herbicidal composition of claim 10, wherein the additional functional ingredient is between about 0.01 wt. % and about 95 wt. %, between 0.01 wt. % and 50 wt. % by weight, between 0.01 wt. % and about 25 wt. %, or between about 0.01 wt. % and 15 wt. %, depending on the desired use and function of the herbicidal composition.

12. The herbicidal composition of claim 1, wherein the composition is formulated as an aqueous solution, a non-aqueous solution, granules, or a powder.

13. The herbicidal composition of claim 1, wherein the composition is a concentrate.

14. A method of controlling weeds, comprising:
    administering the composition of claim 1 to a plurality of plants, wherein an herbicidal effect occurs to any of said weeds in said plurality of plants.

15. The method of claim 14, wherein the composition is administered as a preemergent treatment.

16. The method of claim 15, wherein the composition is administered at a concentration from about 1.0 kg ai/ha to about 45.0 kg ai/ha.

17. The method of claim 14, wherein the composition is administered as a post emergent treatment.

18. The method of claim 17, wherein the composition is administered at a concentration of from about 1.0 kg ai/ha to about 40.0 kg ai/ha.

19. The method of claim 14, wherein the weeds and/or the plants are herbicide resistant.

20. A method of increasing herbicidal effect of a synthetic or organic herbicide to a plant tolerant to said herbicide, the method comprising:
    combining said synthetic or organic herbicide with the *Mentha* sp. of claim 1.

* * * * *

UNITED STATES PATENT AND TRADEMARK OFFICE
CERTIFICATE OF CORRECTION

| | |
|---|---|
| PATENT NO. | : 11,771,095 B2 |
| APPLICATION NO. | : 17/249816 |
| DATED | : October 3, 2023 |
| INVENTOR(S) | : Chad L. Brommer |

It is certified that error appears in the above-identified patent and that said Letters Patent is hereby corrected as shown below:

On the Title Page

Item [54] and in the Specification Column 1 Line 1:
Delete: "HERBICIDAL MENTHA PANTSD, EXTRACT COMPOSITIONS AND METHODS OF USING SAME000000000000000,001"
Insert: --HERBICIDAL MENTHA PLANT EXTRACT COMPOSITIONS AND METHODS OF USING SAME--

Signed and Sealed this
Fourteenth Day of November, 2023

Katherine Kelly Vidal
*Director of the United States Patent and Trademark Office*